United States Patent
Shioya et al.

(10) Patent No.: US 6,779,872 B2
(45) Date of Patent: Aug. 24, 2004

(54) INK JET RECORDING METHOD AND INK JET RECORDING APPARATUS

(75) Inventors: Makoto Shioya, Tokyo (JP); Yasuyuki Tamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/254,524

(22) Filed: Sep. 26, 2002

(65) Prior Publication Data

US 2003/0025757 A1 Feb. 6, 2003

Related U.S. Application Data

(62) Division of application No. 08/880,538, filed on Jun. 23, 1997, now Pat. No. 6,491,372, which is a division of application No. 08/136,107, filed on Oct. 14, 1993, now abandoned.

(30) Foreign Application Priority Data

Oct. 16, 1992 (JP) .............................. 4-278712
Sep. 14, 1993 (JP) .............................. 5-228927

(51) Int. Cl.[7] .................................. B41J 2/15
(52) U.S. Cl. ......................................... 347/41; 347/37
(58) Field of Search ........................ 347/41, 12, 40, 347/15, 43, 37, 16

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. ............... 347/56 |
| 4,558,333 A | 12/1985 | Sugitani et al. |
| 4,608,577 A | 8/1986 | Hori |
| 4,642,653 A | 2/1987 | Ito et al. ............... 347/15 |
| 4,723,129 A | 2/1988 | Endo et al. |
| 4,740,796 A | 4/1988 | Endo et al. |
| 4,965,593 A | 10/1990 | Hickman ............... 347/41 X |
| 5,233,366 A | 8/1993 | Stephany ............... 347/15 |
| 5,430,469 A | 7/1995 | Shioya et al. |
| 5,515,479 A | 5/1996 | Klassen ............... 358/1.9 |
| 6,012,796 A | 1/2000 | Tanaka |
| 6,012,798 A | 1/2000 | Shioya |

FOREIGN PATENT DOCUMENTS

| | | |
|---|---|---|
| EP | 0300743 | 1/1989 |
| EP | 0376596 | 7/1990 |
| EP | 0430451 | 1/1991 |
| EP | 0430451 | 6/1991 |
| EP | 0506381 | 9/1992 |
| JP | 056847 | 5/1979 |
| JP | 123670 | 7/1984 |
| JP | 138461 | 8/1984 |
| JP | 071260 | 4/1985 |
| JP | 107975 | 6/1985 |
| JP | 4-259566 | 9/1992 |
| JP | 155036 | 6/1993 |
| JP | 06-115100 | 4/1994 |
| WO | WO 92-017340 | 10/1992 |
| WO | WO 93-004443 | 3/1993 |

Primary Examiner—Lamson D Nguyen
(74) Attorney, Agent, or Firm—Fitzpatrick, Cella, Harper & Scinto

(57) ABSTRACT

Two lines extending in the main scanning direction build a set of lines (L1, L2) each of which is formed by a plurality of dots. Assignment is alternately executed to preceding scanning and subsequent scanning so as to allow each of the lines (L1, L2) formed by a number of pixels (P1, P2, P4, P3, P5, P6, P8, P7, - - - ) to extend along a snake movement-like route. Thus, dots located adjacent to each other in the auxiliary scanning direction are not formed by same scanning, and a quantity of ink spreading on a recording medium without penetration of the ink through the latter can be reduced. Consequently, there few arises stripe and fluctuation in density, whereby an excellent quality of image having sharp edge portions can be obtained without any occurrence of a problem attributable to the presence of unfixed ink.

12 Claims, 23 Drawing Sheets

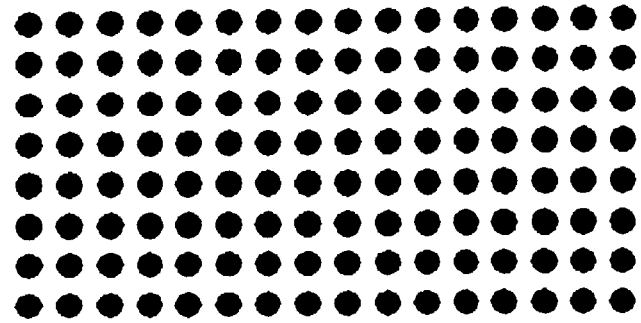
"IMAGE DATA"
ROW OF DOTS ARRANGED IN THE MAIN SCANNING DIRECTION (LINE)
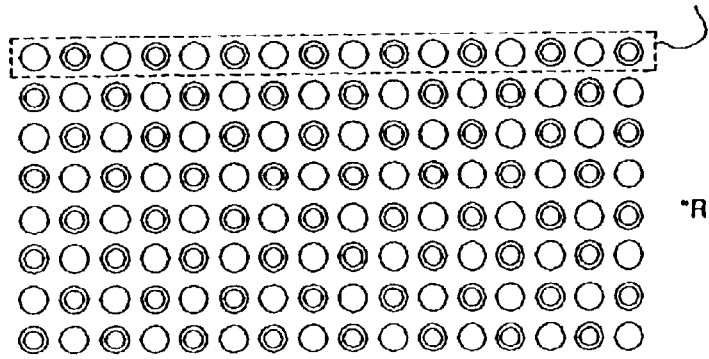
"RECORDING METHOD"
● : DOTS TO BE RECORDED
○ : DOTS RECORDED DURING PRECEDING SCANNING
◎ : DOTS RECORDED DURING SUBSEQUENT SCANNING
PRIOR ART
*FIG. 1*

PRIOR ART
FIG.6

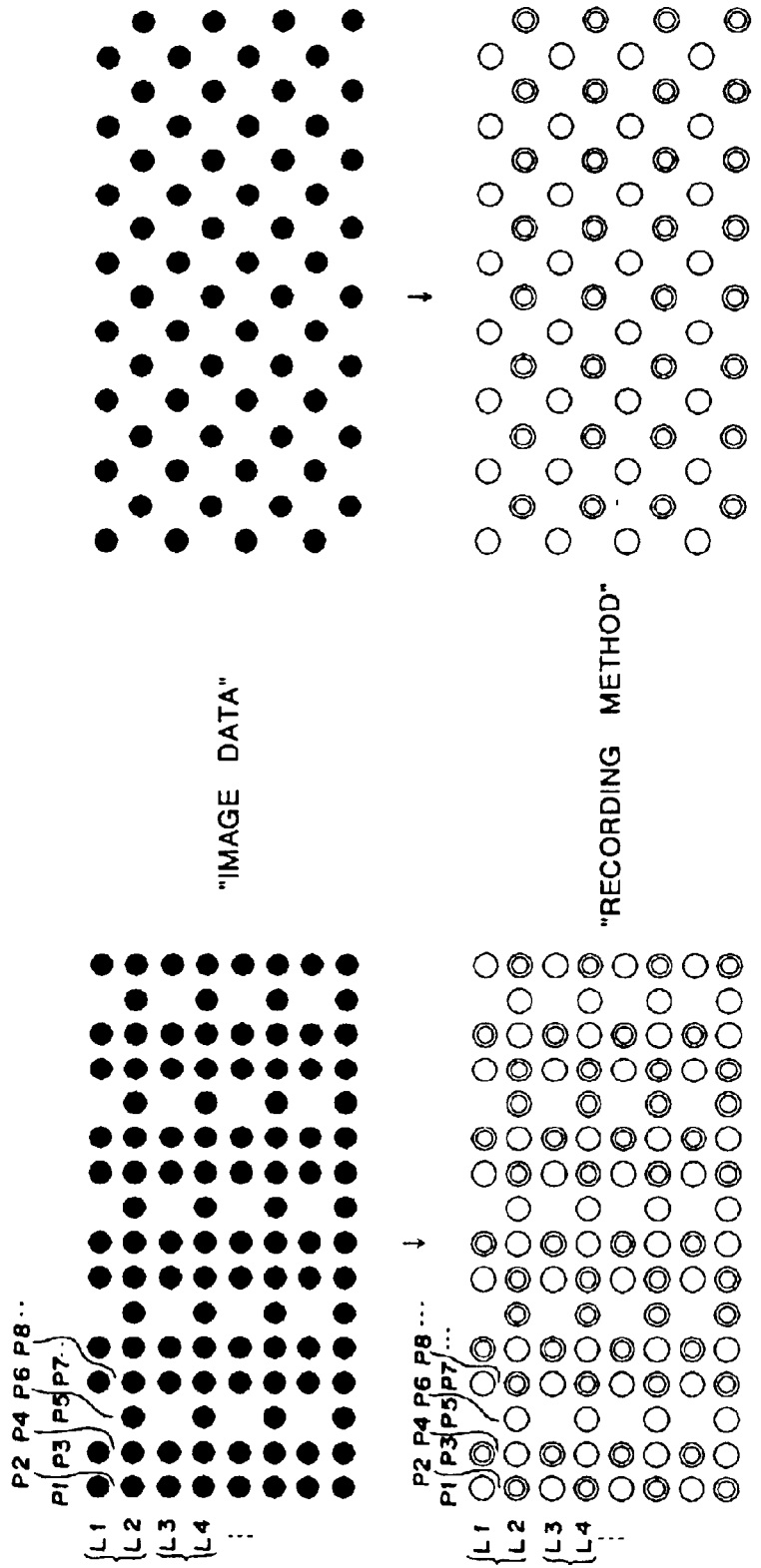

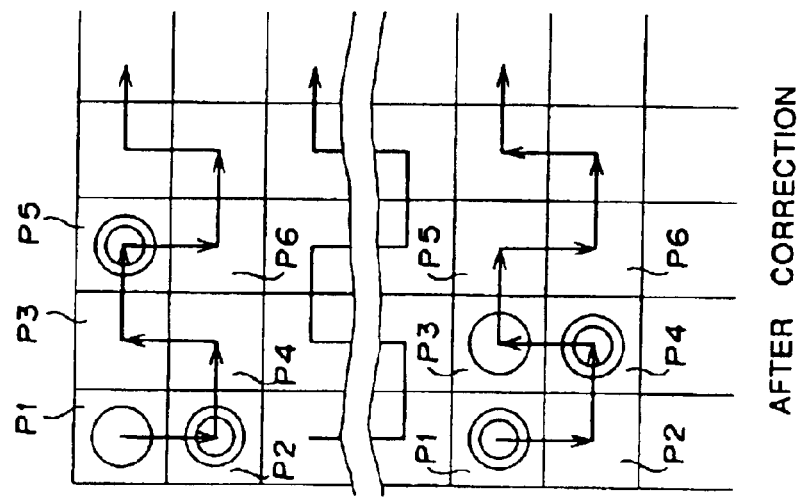
FIG.12A  BEFORE CORRECTION
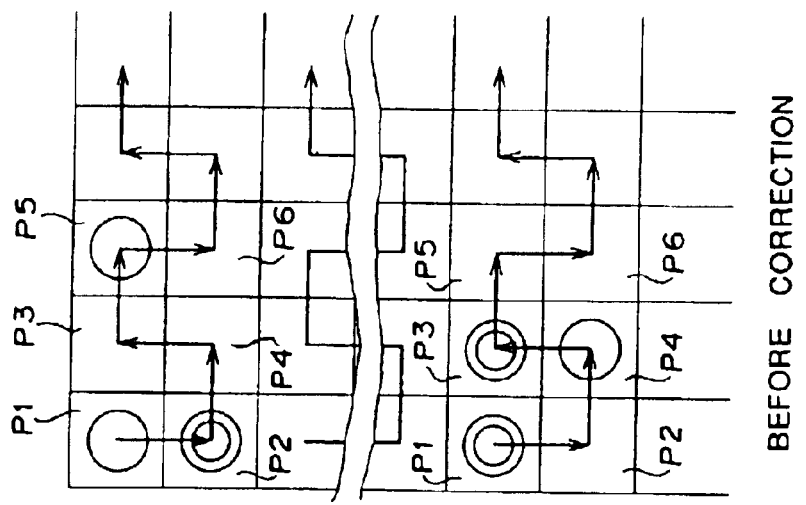
FIG.12B  AFTER CORRECTION

● : DOT TO BE RECORDED (NO SCANNING DETERMINED)
○ : DOT RECORDED AFTER PRECEDING SCANNING
◎ : DOT RECORDED AFTER SUBSEQUENT SCANNING
← : PREFERENCE LINE
←☆ : NEW PREFERENCE LINE
↓ : COLUMN TO BE PROCESSED

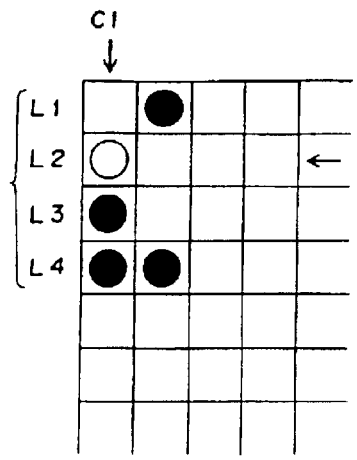
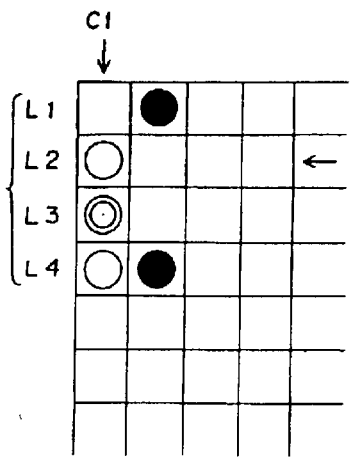
*FIG.14A*  *FIG.14B*
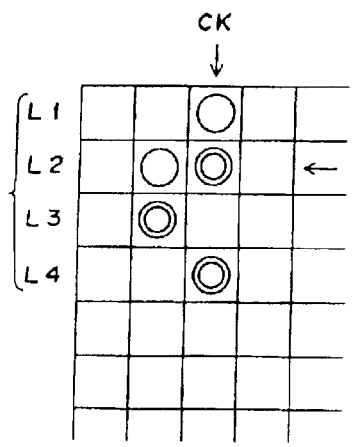
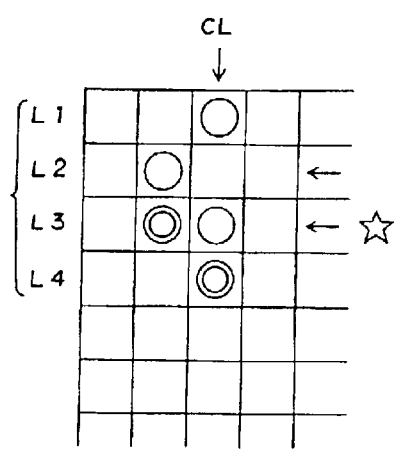
*FIG.14C*  *FIG.14D*
- ● : DOT TO BE RECORDED (NO SCANNING DETERMINED)
- ○ : DOT RECORDED AFTER PRECEDING SCANNING
- ◎ : DOT RECORDED AFTER SUBSEQUENT SCANNING
- ← : PREFERENCE LINE
- ←☆ : NEW PREFERENCE LINE
- ↓ : COLUMN TO BE PROCESSED

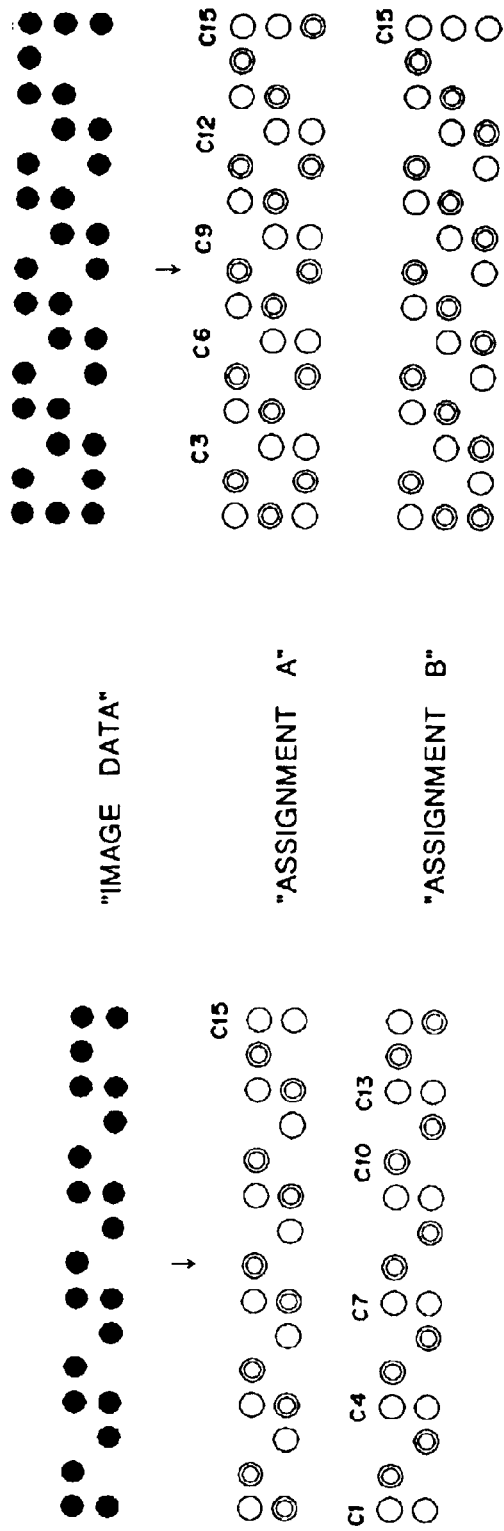

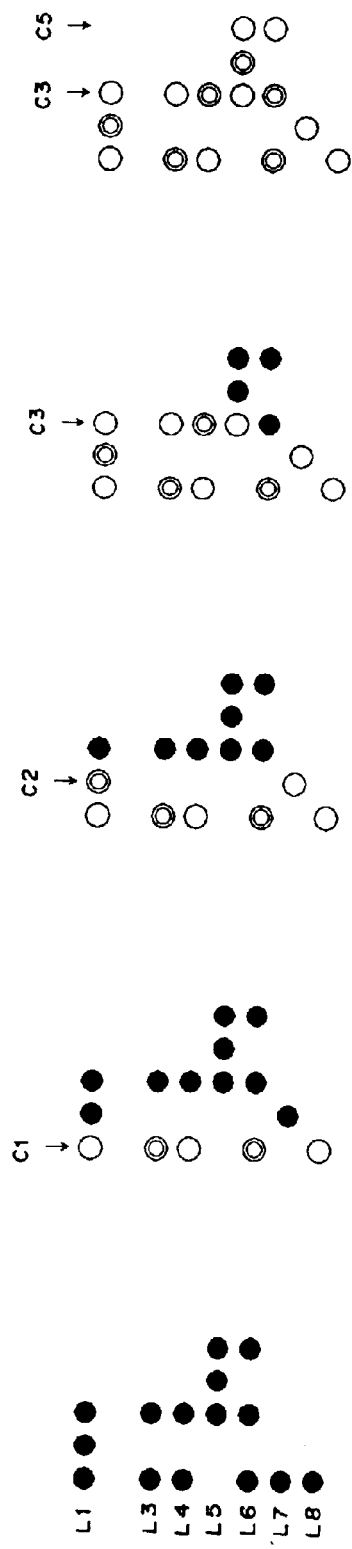

```
                                    C1 C2 C3 C4  C6 C7 C8
                                    ○●●●  ○○○       CANDIDATE A

L1 ●●●●  ●●●    —

"IMAGE DATE"
                                    ○●●●  ○◎○       CANDIDATE B
```

● : DOT TO BE RECORDED
○ : DOT RECORDED AFTER PRECEDING SCANNING
◎ : DOT RECORDED AFTER SUBSEQUENT SCANNING

"IMAGE DATA"

|    | C1 | C2 | C3 |
|----|----|----|----|
| L1 | ①  |    | ②  |
| L2 |    | ①  | ③  |
| L3 | ②  | ①  | ③  |
| L4 | ②  |    | ②  |

FIG.21A

MAIN SCANNING DIRECTION →

① : DOT FORMED BY A SINGLE INK DROPLET
② : DOT FORMED BY TWO INK DROPLETS
③ : DOT FORMED BY THREE INK DROPLETS
1 : INK EJECTION AFTER FIRST SCANNING
2 : INK EJECTION AFTER SECOND SCANNING
3 : INK EJECTION AFTER THIRD SCANNING
4 : INK EJECTION AFTER FOURTH SCANNING

"ASSIGNMENT EXECUTED FOR SCANNING"

FIG.21B  FIG.21C  FIG.21D  FIG.21E  FIG.21F

→ : PREFERENCE LINE
☆→ : NEW PREFERENCE LINE

"IMAGE DATA"

① : DOT FORMED BY A SINGLE INK DROPLET
② : DOT FORMED BY TWO INK DROPLETS
③ : DOT FORMED BY THREE INK DROPLETS

|    | C4 | C5 | C6 | C7 |
|----|----|----|----|----|
| L1 | ③  | ③  | ①  | ②  |
| L2 | ①  | ③  | ③  | ①  |

FIG.22A

"ASSIGNMENT EXECUTED FOR SCANNING"

1 : INK EJECTION AFTER FIRST SCANNING
2 : INK EJECTION AFTER SECOND SCANNING
3 : INK EJECTION AFTER THIRD SCANNING
4 : INK EJECTION AFTER FOURTH SCANNING

|    | C4      | C5    | C6    | C7  |
|----|---------|-------|-------|-----|
| L1 | 1 2 4   | 2     | 1 3   | 4   |
| L2 | 3       | 2 3 1 | 2 4 2 | 4 2 |
|    | 1       | 1     |       |     |

FIG.22B

INK JET RECORDING METHOD AND INK JET RECORDING APPARATUS

CROSS REFERENCE TO RELATED APPLICATIONS

This is a divisional application of application Ser. No. 08/880,538 filed Jun. 23, 1997, now U.S. Pat. No. 6,491,372, which is a continuation application of application Ser. No. 08/136,107 filed Oct. 14, 1993, now abandoned.

BACKGROUND OF THE INVENTION

1. Field of the Invention

The present invention relates generally to an ink jet recording method and an ink jet recording apparatus. More particularly, the present invention relates to an ink jet recording method and an ink jet recording apparatus wherein recording is achieved using an ink jet recording head including a plurality of ink ejection ports.

2. Description of the Related Art

With a conventional recording process having a recording head including a plurality of ejection ports employed therefor, each row of plural dots to be formed by main scanning of a recording head (hereinafter referred simply as a line) is generally formed with ink droplets ejected from the same ejection port.

On the other hand, a pattern of each dot forming a line is classified into two types, one of them being such that one dot is formed by one ink droplet corresponding to binary gray level recording and the other one being such that one dot is formed by a plurality of ink droplets corresponding to multi-level recordings.

A so-called multi-droplet process has been known as one of the conventional method for forming a dot with ink droplets ejected from the same ejection port corresponding to the multi gray level recordings. This type of method is intended to express the gray level of a recorded image by forming one dot (pixel) with a plurality of ink droplets shot onto a single location on a recording medium and then changing a dot area or a dot density depending on the number of ink droplets shot onto the recording medium, and has an advantage that the foregoing method makes it possible to perform a recording operation at a high speed for forming an image with high resolution and high gray level compared with various conventional methods, e.g., a tone production method by density of each element, a tone production method by density pattern, a dither method and an ink density variation method by using plural density of ink.

Although the respective dots forming a line are formed corresponding to binary gray level recording or the multi gray level recording, a problem such as running over of ink or bleeding, which is described below, may occur. Especially, the problem such as bleeding may appear when intending to achieve a high quality recorded image by solving the problem described below which may occur in the case that the dots are formed with ink droplets ejected from the same ejection port, so that the high quality recorded image can not be achieved.

With respect to a plurality of ejection ports on the recording head, in the case that the direction of ejection of ink droplets from the ejection ports and a quantity of ink ejected from the same ejection port fluctuate from ejection port to ejection port, there arises an occasion that a certain stripe appears on a recorded image which should originally have constant density variation or a density of the image fluctuates. More specifically, in the case that the direction of ejection of ink droplets fluctuates, the position of a dot formed on a recording paper serving as a recording medium is offset from an original one, resulting in a stripe appearing on the recorded image. When a quantity of ink ejected from the ejection ports fluctuates, a size of each dot formed on the recording paper or a density of the same fluctuates. As a result, there arises an occasion that the density of the recorded image fluctuates.

As a measure to be taken for avoiding the foregoing problems, a proposal has been made with respect to a method of producing a recording head at a very high accuracy in order to suppress fluctuation in the direction of ejection of ink from each ejection port and a quantity of ink ejected from the same as far as possible. However, with the proposed method as mentioned above, there arises a problem that each recorded image is obtained not only at a high production cost but also at a reduced yielding rate.

In addition, as a measure to be taken for obviating a malfunction of fluctuation in density, a proposal has been made with respect to a method of changing the number of shot ink droplets so as to eliminate variation of a quantity of ejected ink among a plurality of ink ejection ports on a recording head. However, in the case that the proposed method is installed in a working system for executing the proposed method, there arises a problem that a running cost of the working system is undesirably increased. Further, it is found that the proposed method is unexpectedly ineffective for preventing a stripe from appearing on a recorded image. In the case that fluctuation in a quantity of ejected ink among the ejection ports varies as time elapses, it becomes necessary to adjust the number of shot ink droplets again. This leads to a problem that each maintenance service for the working system is unsatisfactorily achieved.

To solve the aforementioned problems, an improved recording method is disclosed in an official gazette of, e.g., Japanese Patent Application Laying-open No. 107975/1985. According to this prior art, to reduce variation of the direction of ink ejection and a quantity of ejected ink among a plurality of ejection ports, and moreover, hardly visualize stripe and fluctuation in density, a single line extending in the main scanning direction is formed by a plurality of ink droplets ejected from the ejection ports.

FIG. 1 is a schematic view which illustratively explains the recording method to be practiced according to the prior art. Specifically, pixels not located adjacent to each other not only in the vertical direction but also in the transverse direction are recorded on a recording paper (not shown) by preceding main scanning (hereinafter referred to as preceding scanning) with a recording head, and subsequently, the recording paper is fed in the auxiliary scanning direction by a distance equal to a half of the length of a row of ejection ports so that the remaining pixels failing to be recorded by the preceding scanning are recorded on the recording paper by subsequent scanning. According to the above-described prior art, for example, in the case that all pixels located on each line as illustrated by "image data" in FIG. 1 are formed on the recording paper, a row of dots arranged in the main scanning direction (i.e., a line) is formed with ink droplets ejected from two different ejection ports. Thus, distribution of the dots in the ink ejecting direction is averaged, resulting in stripe on the line being hardly visualized. With the recording method shown in FIG. 1, when it is assumed that variation of a quantity of ink ejection among the ejection ports is normally distributed with a standard deviation $\sigma$, the variation of a quantity of ink ejection among a plurality of lines is reduced to a level of $\sigma/\sqrt{2}$. Consequently, since variation of a quantity of ejected ink among the lines is visually recognized as variation of density among the lines, the recorded image having few fluctuation in density is obtainable.

For example, as illustrated by "image data" in FIG. 2, in the case that a specific halftone image (i.e., all pixels are not formed) is recorded on a recording paper (not shown), since a row of dots arranged in the main scanning direction is formed by ink droplets ejected from the same ejection port when the foregoing conventional recording method is employed, there arises a problem that fluctuation in stripe and density can not be reduced at all.

Another recording method of hardly visually recognizing stripe and fluctuation in density is disclosed in U.S. Ser. No. 894,555 which was proposed by common assignee to the present invention. According to this prior art, in association with assignment of image data to ejection ports, ink dots forming a row of dots arranged in the main scanning direction (i.e., a line) are sequentially assigned to scannings different from each other. Once this conventional recording method is employed, not only in the case that all pixels as illustrated by "image data" in FIG. 1 are formed but also in the case that a halftone image as illustrated by "image data" in FIG. 3 is recorded on the recording paper, since each line is formed by ink droplets ejected from two different ejection ports as illustrated by "recording method" in FIG. 3, stripe and fluctuation in density can be reduced without fail.

With this conventional recording method, however, depending on the type of image data, there arises an occasion that a group of continuous adjacent dots is formed by the same scanning as illustrated by "recording method" in FIG. 4 to form a row of dots arranged in the auxiliary direction. When a row of dots arranged in that way appears in the course of a recording operation on the recording paper having poor ink absorption, ink droplets for forming a group of adjacent dots on the recording paper are united with each other and run over before they penetrate into the recording paper, resulting in a recorded image being visually recognized with an irregularly deformed pattern. In such case, there arise problems that especially, the shape of each edge portion of the recorded image can not clearly be recognized, and in the case of color recording, two inks each having a different color are mixed with each other, resulting in the recorded color image failing to be clearly recognized (the foregoing problems are hereinafter referred to as bleeding).

The conventional recording methods disclosed in Japanese patent Application Laying-open No. 107975/1985 and U.S. Ser. No. 894,555 are employable for either of binary gray level recording and multi gray level recording with appearance of the foregoing problems in association with the formation of each recorded image on the recording paper.

In the case of multi gray level recording for forming a single dot with a plurality of ink droplets, several unique recording methods each available for solving the problems attributable to variation of a quantity of ejected ink among a plurality of ejection ports have been known, and each of the recording methods has similar problems to be improbably solved. These recording method and the problems to be solved with the latter will be described later.

A multi gray level recording method of reducing a malfunction attributable to stripe or the like associated with variation of a quantity of ejected ink among a plurality of ejection ports is exemplified by the method disclosed in U.S. Ser. No. 893,086. FIG. 5 is a schematic view which illustratively explain the conventional multi gray level recording method.

More specifically, an image is recorded by plural times of scannings by forming a same line with ink droplets ejected from different ejection ports. According to this prior art, for example, in the case that a pixel as illustrated by "image data" in FIG. 5 (i.e., a pixel formed by three ink droplets), since the pixel is formed with ink droplets ejected from three different ejection ports, distribution of pixels in the ink ejection direction is averaged, resulting in stripe on a recording paper (not shown) being hardly recognized. When it is assumed that variation of a quantity of ejected ink among a plurality of ejection ports is normally distributed with a standard deviation of a, variation of a quantity of ejected ink among a plurality of lines is reduced to a level of $\sigma\sqrt{3}$. Since the variation of a quantity of ejected ink among the lines is visually recognized as variation of a density of ejected ink, a recorded image having few fluctuation in density can be obtained with the multi-level recording method.

Also, the multi gray level recording method has problems as noted below. More specifically, in the case that "0" pixels as illustrated by "image data" in FIG. 5 are recorded on a recording paper, i.e., in the case that pixels each formed with a single ink droplet are recorded on the same, since a row of dots arranged in the main scanning direction are formed with ink droplets ejected from same ejection port, there arises a problem that fluctuation in stripe and density can not be reduced at all.

In addition, a multi gray level recording method of hardly recognizing fluctuation in stripe and density is exemplified by the method disclosed by U.S. Ser. No. 894,555.

As shown in FIG. 6, the multi gray level recording method is practiced by sequentially assigning the formation of dots within the range defined by a single line extending in the main scanning direction to scannings different from each other. With this conventional recording method, not only in the case that all pixels are recorded on a recording paper (not shown) but also in the case that a halftone image is recorded on the same, a single line extending in the main scanning direction is formed with ink droplets ejected from a plurality of different ejection ports in the same manner as that shown in FIG. 3. Thus, stripe and fluctuation in density can be reduced without fail.

With this conventional recording method, however, since a group of continuous adjacent dots for forming a row of dots arranged in the auxiliary scanning direction are recorded by same scanning, there arises an occasion that a malfunction of bleeding as mentioned above occurs. This is an especially significant problem in the case of multi gray level recording for forming a single dot (i.e., a single pixel) with a plurality of ink droplets.

SUMMARY OF THE INVENTION

An object of the present invention is to provide an ink jet recording method and an ink jet recording apparatus which assure that a high quality image can be recorded while attenuating the problem of running of ink or bleeding.

Another object of the present invention is to provide an ink jet recording method and an ink jet recording apparatus which assure that a high quantity image can be recorded while resolving the above-described problem regarding the ink or the like as well as attenuating the problem attributable to fluctuation in a quantity of ink ejected from each ejection port in the case that recording is effected by employing a two-level recording process or a multi-level recording process.

A further object of the present invention is to provide an ink jet recording method and an ink jet recording apparatus which resolve the above-described problem regarding the running over of ink or the like, and which assure that a high quantity image can be recorded not only with few stripe and few fluctuation in density but also with excellent image sharpness at edge portions of the image wherein the number of ejection ports each capable of recording a row of dots in the main scanning direction is set to be plural, and moreover, dots continuously located adjacent to each other in the auxiliary scanning direction are formed with scannings possibly different from each other.

In a first aspect of the present invention, an ink jet recording method of performing a recording operation with dots each formed on a recording medium with ink ejected from a recording head including a plurality of ejection ports, the method comprises the steps of;

executing assignment based on image data to one of the ejection ports to build a plurality of lines with the dots and to which-numbered scanning to be achieved for ink ejection when the recording operation is performed so as to build the plural lines with the dots formed by plural times of scanning achieved by the recording head, wherein the order of the ejection ports and the scannings are assigned in such a manner that a plurality of dots for building the plural lines are formed by ejecting the ink from the ejection ports different from each other in accordance with an order of plural times of scannings different from each other, and the order of the scannings to be effected for ink ejection for building the lines with the dots is assigned on the basis of an order of scannings for the dots to which assignment has been already executed, on a specific line having the dots belonging thereto while the dots are arranged for building the lines, and on a row of dots located in the direction of extension of the lines, performing the plural times of scannings with the recording head, and forming the dots to which the order of scanning is assigned by ejecting the ink from the ejection ports assigned on completion of each of the plural times of scannings.

In a second aspect of the resent invention, an ink jet recording method of building a recorded image by ejecting ink from a recording head toward a recording medium to form a plurality of dots arranged in a matrix-shaped pattern, the method comprises the step of;

building the recorded image within a whole density range, wherein in the case that two dots located adjacent to each other in a row of dots extending in a first direction of the matrix-shaped pattern or in a second direction different from the first direction, are formed the two dots being formed with a time difference equal to or more than a predetermined time therebetween and in the case that a set of the two dots is randomly located.

In a third aspect of the present invention, an ink jet recording apparatus for performing a recording operation with dots each formed on a recording medium with ink ejected from a recording head including a plurality of ejection ports, the apparatus comprises;

assigning means for executing assignment based on image data to one of the ejection ports to build a plurality of lines with the dots and to which-numbered scanning to be achieved for ink ejection when the recording operation is performed so as to build the plural lines with the dots formed by plural times of scannings achieved by the recording head, wherein, the assigning means serving to execute assignment to an order of the ejection ports and the scannings in such a manner that a plurality of dots for building the plural lines are formed by ejecting the ink from the ejection ports different from each other in accordance with an order of plural scannings different from each other, and the order of the scannings to be effected for ink ejection for building the plural lines with the dots is assigned on the basis of an order of scanning for the dots to which assignment has been already achieved, on a specific line having the dots belonging thereto while the dots are arranged for building the plural lines, and on a row of dots located in the direction of extension of the lines;

scanning means for performing the plural times of scannings with the recording head; and recording/controlling means for forming the dots to which the order of scannings is assigned by ejecting the ink from the ejection ports assigned on completion of each of the plural times of scannings.

In a fourth aspect of the present invention, an ink jet recording apparatus for performing a recording operation with dots each formed on a recording medium with ink ejected from a recording head including a plurality of ejection ports, the apparatus comprises;

assigning means for executing assignment based on image data to one of the ejection ports to build a plurality of lines with the dots and which-numbered scanning to be achieved for ink ejection when the recording operation is performed so as to build the lines with the dots formed by plural times of scannings achieved by the recording head, wherein, the assigning means serving to execute assignment to an order of the ejection ports and the scanning in such a manner that a plurality of dots for building the plural lines by injecting the ink from the ejection ports in accordance with the order of plural scannings different from each other, and the order of the scannings to be effected for ink ejection for building the plural lines with the dots is assigned on the basis of an order of scanning for the dots to which assignment has been already achieved, on a specific line having the dots belonging thereto while the dots are arranged for building the line, and on a row of dots located in the direction of extension of the plural lines;

scanning means for performing scanning with the recording head;

paper feed means for feeding the recording medium every time the scanning is performed; and recording/controlling means for forming dots to which the order of scannings is assigned by ejecting the ink from ejection ports assigned on completion of the scanning, the ejection ports assuming the positions corresponding to the conveyance of the recording medium.

In a fifth aspect of the present invention, an ink jet recording method of performing a recording operation with dots each formed on a recording medium with ink ejected from a recording head including a plurality of ejection ports while scanning of the recording head is executed;

wherein when the scanning is assigned to the dot for forming the dot, the assignment is executed considering a two dimensional arrangement of the dots including the dot.

The above and other objects, effects, features and advantages of the present invention will become more apparent from the following description of embodiments thereof taken in conjunction with the accompanying drawings.

BRIEF DESCRIPTION OF THE DRAWINGS

FIG. 1 is a schematic view which illustratively explains a conventional ink jet recording method;

Figure 6:
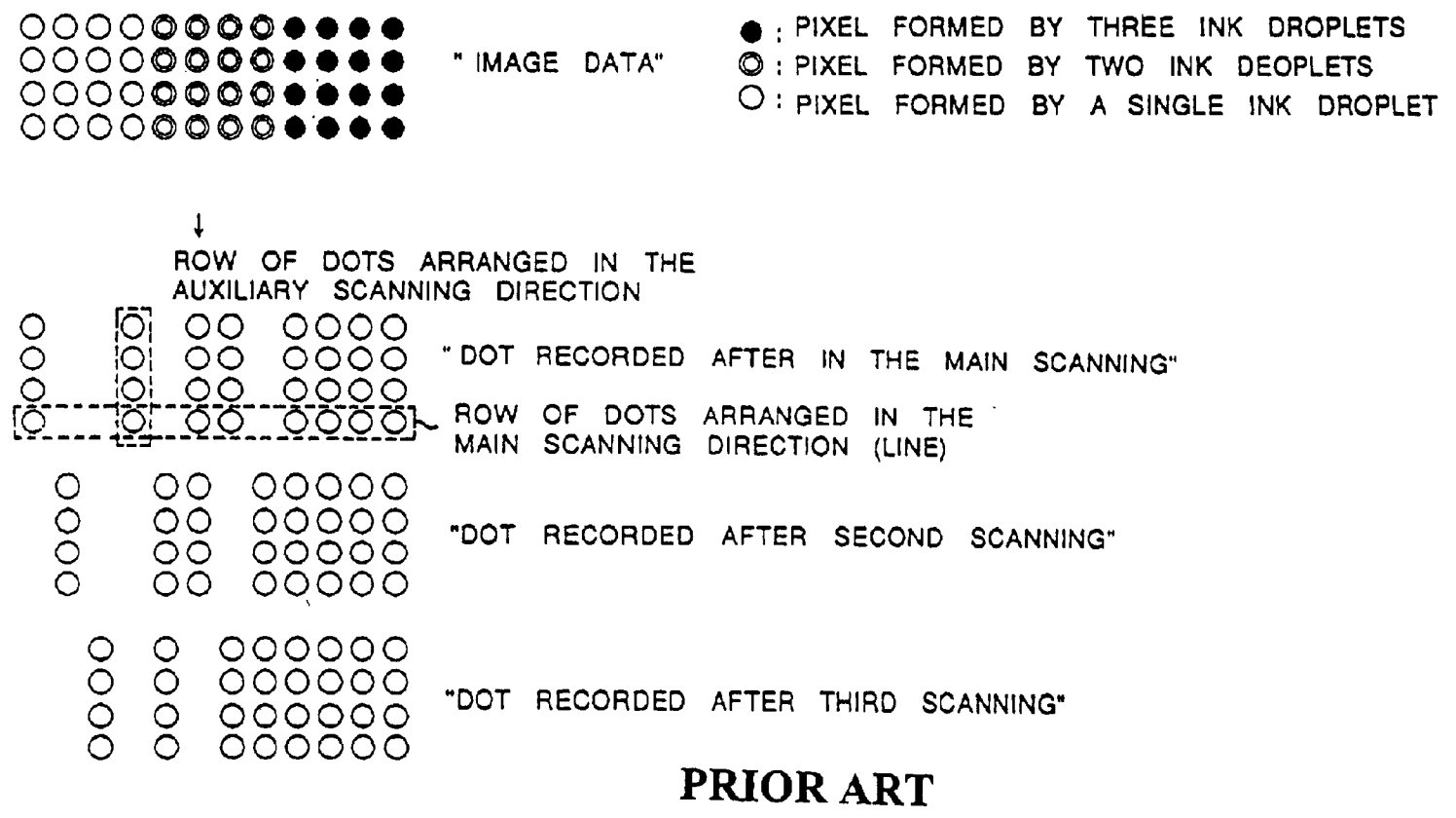

FIG. 6 is a schematic view which illustratively explains further another conventional ink jet recording method;

FIG. 11A and FIG. 11B are schematic views which show by way of example the assignment of scanning to be executed for forming the dots by employing the ink jet recording method according to the first embodiment of the present invention;

FIG. 12A and FIG. 12B are explanatory views which illustrate by way of the scanning assignment i of scanning to be achieved for forming the dots by employing the ink jet recording method according to the second embodiment of the present invention;

FIG. 14A to FIG. 14D are explanatory views which illustrate by way of example the assignment of scanning to be achieved for forming the dots by employing the ink jet recording method according to the fourth embodiment of the present invention;

FIG. 15A and FIG. 15B are schematic views which show by way of example the assignment of scanning to be achieved for forming the dots by employing the ink jet recording method according to the fifth embodiment of the present invention;

FIG. 16A to FIG. 16E are schematic views which show by way of example the assignment of scanning to be achieved for forming the dots by employing the ink jet recording method according to the sixth embodiment of the present invention;

FIG. 17A to FIG. 17C are schematic views which show by way of example the assignment of scanning to be achieved for forming the dots by the ink jet recording apparatus according to the seventh embodiment of the present invention;

FIG. 21A to FIG. 21F are explanatory views which illustrate by way of example the assignment of scanning for forming the dot by employing the ink jet recording method according to the ninth embodiment of the present invention;

FIG. 22A and FIG. 22B are explanatory views which illustrate by way of example the assignment of scanning for forming the dots by employing the ink jet recording method according to the tenth embodiment of the present invention;

DESCRIPTION OF THE PREFERRED EMBODIMENTS

The present invention will now be described in detail hereinafter with reference to the accompanying drawings which illustrate preferred embodiments thereof.

In each embodiment of the present invention described below, an ink jet recording apparatus which performs recording without giving rise to density fluctuation as well as bleeding is explained.

Figure 2:
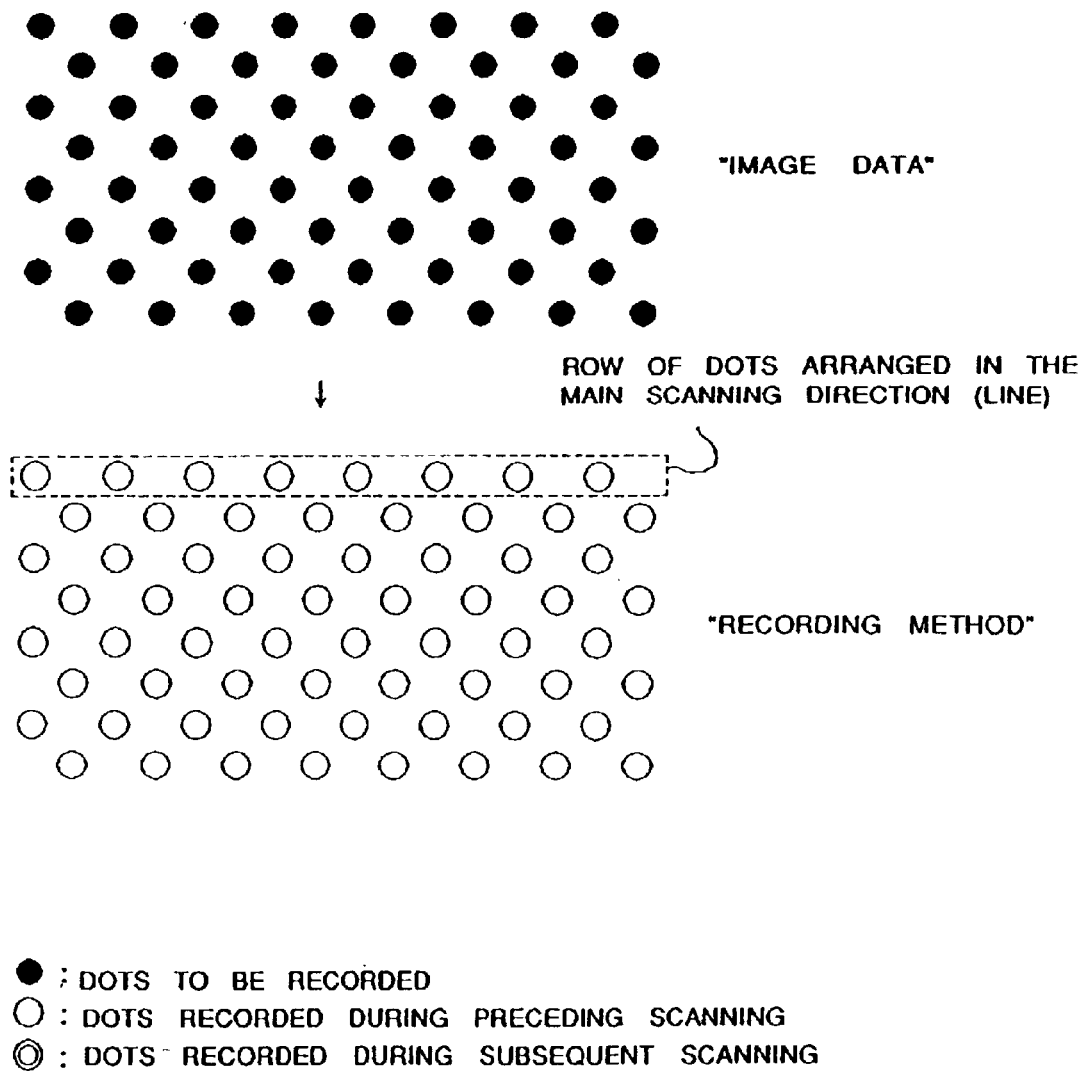
FIG. 2 is a schematic view which illustratively explains the problem arising with the conventional ink jet recording method.
Figure 3:
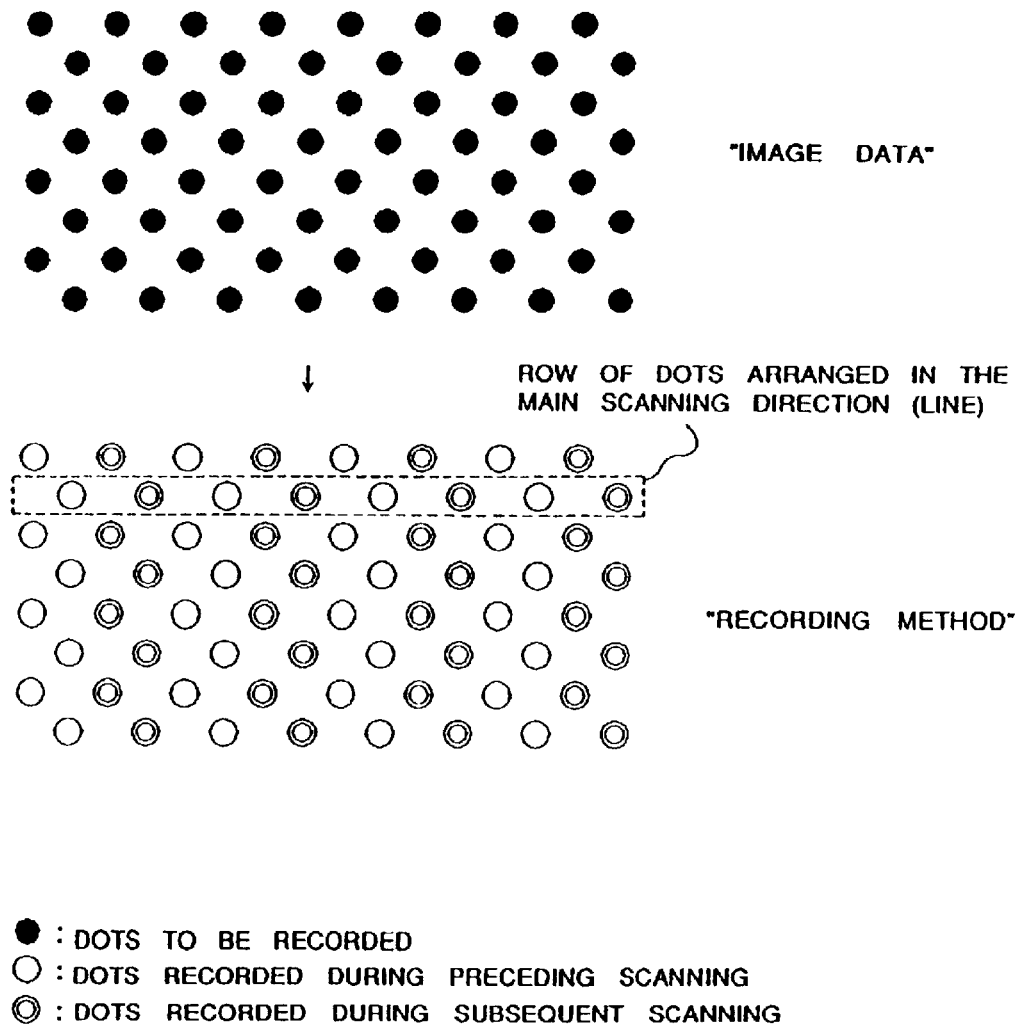
FIG. 3 is a schematic view which illustratively explains other conventional ink jet recording method.
Figure 4:
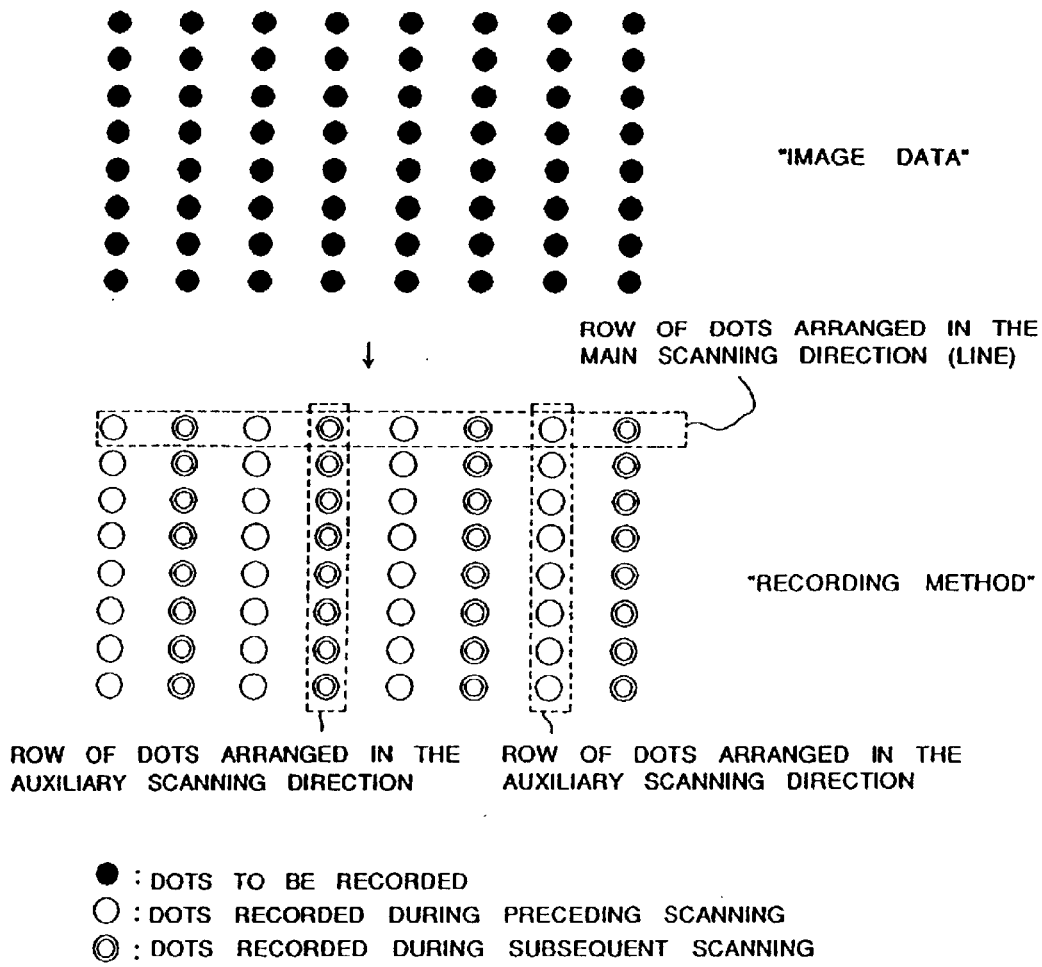
FIG. 4 is a schematic view which illustratively explains the problem arising with the conventional ink jet recording method shown in FIG. 3.
Figure 5:
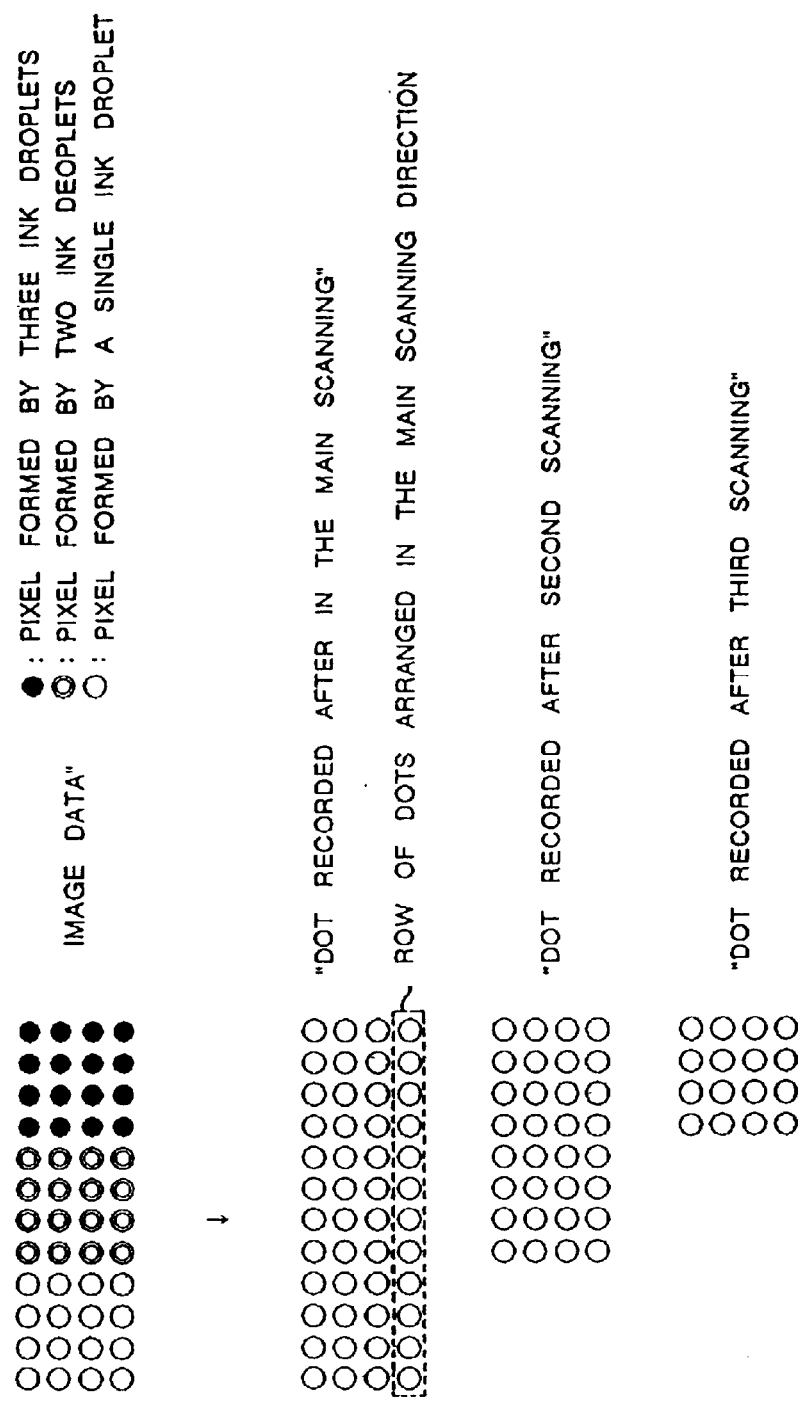
FIG. 5 is a schematic view which illustratively explains another conventional ink jet recording method.
Figure 7:
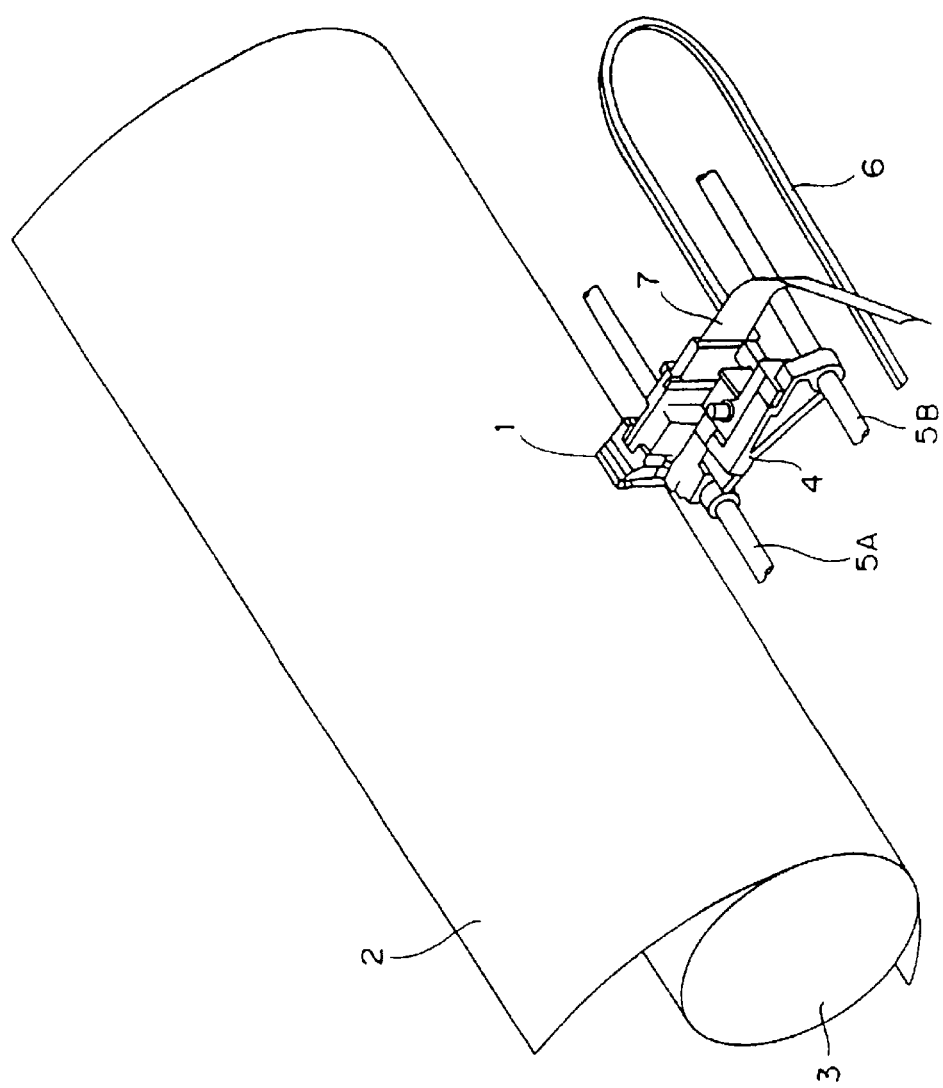
FIG. 7 is a perspective view which schematically shows by way of example an ink jet recording apparatus to which the present invention is applicable.

FIG. 7 is a perspective view which schematically shows by way of example an ink jet recording apparatus to which the present invention is applicable.

Referring to FIG. 7, the ink jet recording apparatus includes a recording head 1 having sixteen ejection ports formed thereon at an arrangement density rate of 16 pieces/mm, and heaters are disposed in ink paths communicated with the respective ejection ports for the purpose of generating thermal energy to be utilized for ink ejection. In response to an electric pulses applied to each heater, the heater generates heat which in turn causes film boiling to occur in the ink, and as a gas bubble grows attributable to the film boiling, the ink is ejected from the ejection port. In addition, the ink jet recording apparatus includes a carriage 4 on which the recording head 1 is mounted so as to move together with the recording head 1. The slidable movement of the carriage 4 is properly guided by two guide shafts 5A and 5B along which the carriage 4 is slidably moved in the leftward/rightward direction. To feed ink to the recording head 1, an ink feeding tube 6 is extended from an ink tank (not shown), and a flexible cable 7 serves to send a variety of driving signals and control signals from a controlling section for the apparatus shown in FIG. 8 to a head driving circuit disposed in the recording head 1 based on recorded data. As will be described later, the controlling section performs assignment processing for the ejection port usable for forming each dot as well as for main scanning with reference to the image data. It is obvious that the ink feeding tube 6 and the flexible cable 7 are molded of a flexible material so as to assure that they are followably moved as the carriage 4 is slidably displaced. Since the carriage 4 is operatively connected to a belt (not shown) extending in parallel with the guide shafts 5A and 5B and this belt is driven by a carriage motor (not shown), the carriage 4 can slidably be moved in the leftward/rightward direction as desired.

In addition, the ink jet recording apparatus includes a platen roller 3 which extends in parallel with the guide shafts 5A and 5B in the longitudinal direction while defining the available recording surface area of a recording paper 2 serving as a recording material. As the platen roller 3 is rotated, paper feeding is effected with the recording paper 2. On the other hand, as the carriage 4 is slidably displaced in the leftward/rightward direction, the recording head 1 ejects ink droplets toward the recording surface of the recording paper 2 facing to the ejection ports thereof in conformity with the image data.

Figure 8:
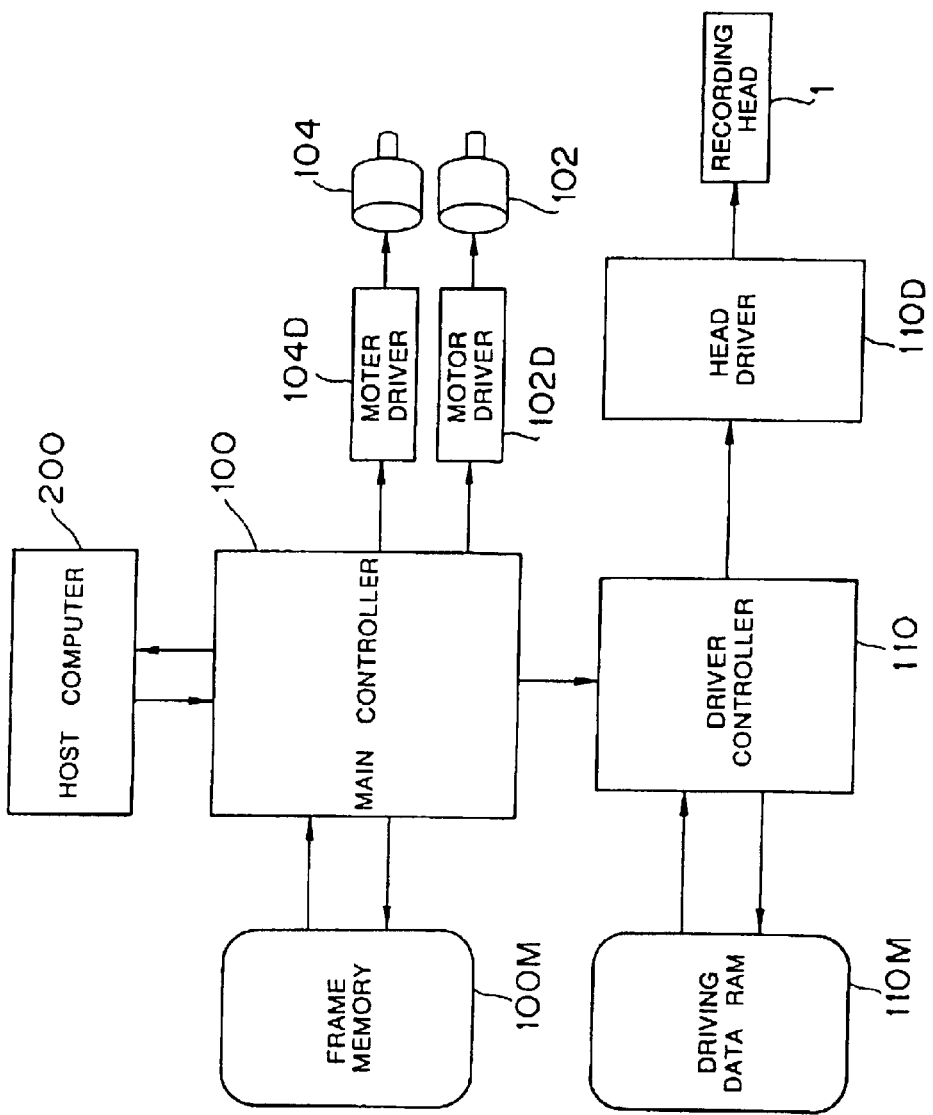
FIG. 8 is a block diagram which shows the structure of a controlling structure for the ink jet recording apparatus shown in FIG. 7.

FIG. 8 is a block diagram which shows the structure of the controlling section for the ink jet recording apparatus shown in FIG. 7.

In response to the image data sent from a host computer 200, the ink jet recording apparatus performs a recording operation, and the sent image data are stored in a frame memory 100M. As will be described later in each embodiment of the present invention, a main controller 100 executes assignment processing not only with respect to which ejection port is used to eject ink droplets for forming each dot but also with respect to which scanning is effected for ejecting ink droplets. The results obtained from the foregoing assignment processing are stored in a driving data RAM 110M as driving data. A driver controller 110 serves to send the driving data assigned during the assignment processing to a driver head 110D as corresponding an ejection port data every time scanning is effected. Consequently, ink is ejected from the recording head 1 in a predetermined timing relationship corresponding to the slidable displacement of the carriage 4.

The main controller 100 controls the rotation of a carriage motor 104 via a motor driver 104D, causing the slidable displacement of the carriage 4 to be controlled. In addition, the rotation of the platen roller 3 can be controlled by controlling the rotation of a paper feed motor 102.

Figure 9:
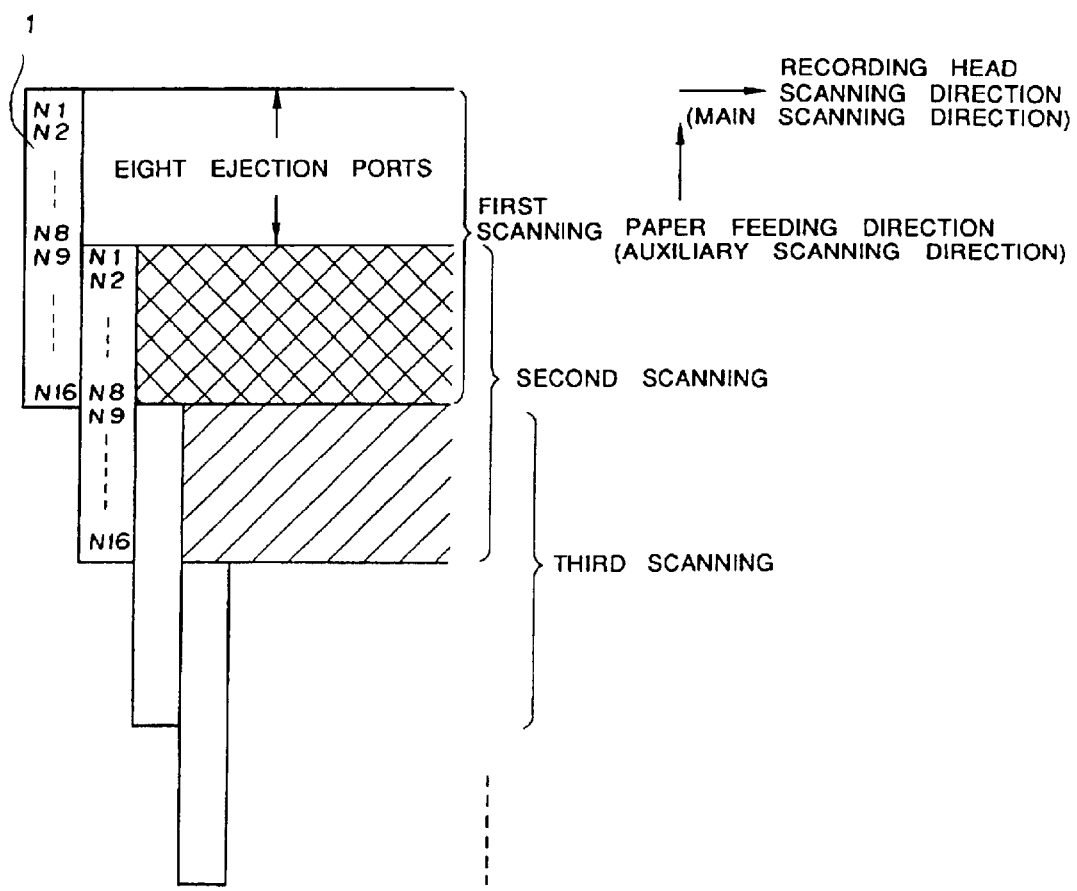
FIG. 9 is a schematic view which shows the relationship between scanning of a recording head and paper feeding each of which is to be achieved by employing an ink jet recording method according to each of first to seventh embodiments of the present invention.

FIG. 9 is a schematic view which explains the combination of a quantity of paper feeding with an ejection port to be used on completion of each scanning wherein the foregoing combination is employable in a first embodiment to a seventh embodiment of the present invention as will be described later.

In the drawing, reference numeral 1 generally designates a recording head, and sixteen ejection ports N1 to N16 are arranged in the vertical direction. When recording is to be effected with the recording paper, as the carriage is slidably displaced, dots are first recorded on the recording paper in the corresponding scanning using only the ejection ports N9 to N16 by employing a method as will be described later in the respective embodiments. Next, the recording paper is fed in the upward direction by a distance corresponding to the number of the foregoing ejection ports (for the purpose of convenience, FIG. 9 shows that the recording head is relatively displaced in the downward direction), and recording is then effected using ejection ports N1 to N16. At this time, while the pixel arrangement is taken into account, the ejection ports N1 to N8 serve to record a dot complementary to a dot to be recorded on completion of the preceding scanning, and the ejection ports N9 to N16 serve to record a new dot (i.e., a dot assigned with reference to the image data in the same manner as that recorded on completion of the preceding scanning by employing the method to be described later). Next, the recording paper is fed in the upward direction again by a distance corresponding to the eight ejection ports, and recording is then effected using the ejection ports N1 to N16. Thus, the whole image surface is recorded with dots by sequentially repeating the recording operation as mentioned above. It should be noted that an end image is recorded with dots at the lowermost end part of an image without any ejection of ink droplets from the ejection ports N9 to N16.

Incidentally, the present invention is concerned with a method of assigning which ejection port is to be used for ejecting ink therefrom for forming a dot to be recorded as well as which scanning is to be executed for the purpose of ink ejection based on the image data when an image is recorded on the recording paper. Among a variety of assigning methods, some of them will be described in the following.

(Embodiment 1) (Simple snake dance)

Figure 10:
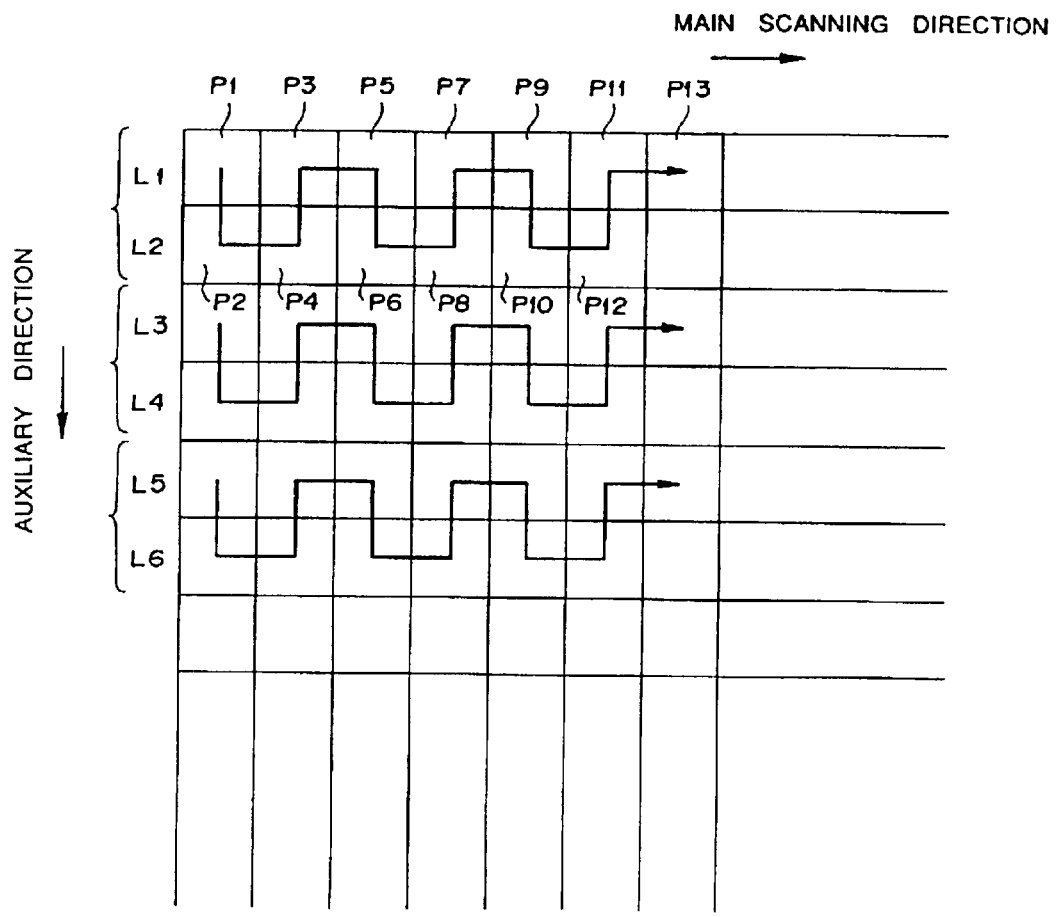
FIG. 10 is an explanatory schematic view which illustratively explains assignment of scanning to be executed for forming the dots by employing the ink jet recording method according to the first embodiment of the present invention.

FIG. 10 shows by way of illustrative view a recording method to be practiced according to a first embodiment of the present invention. Specifically, this recording method refers to a method of assigning a dot to be recorded to either of twice scannings based on the image data. As shown in FIG. 10, dots to be recorded are sequentially assigned to either of twice scannings within the range defined by adjacent two lines (L1 and L2, L3 and L4, L5 and L6, - - -). Specifically, the image data are sequentially scanned along the snake movement-like route extending with the range defined by two lines while an odd-numbered line and an even-numbered line are combined with each other to form one set of lines, whereby dots to be recorded are alternately assigned to preceding scanning and subsequently scanning. This assignment processings will be described in more detail hereinafter with reference to FIG. 10 and FIG. 11A.

Referring to FIG. 10, each assignment processing is exemplified by a set of odd-numbered line L1 and even-numbered line L2. First, the image data corresponding to a pixel P1 on the line L1 are examined. At this time, since "I" (which instructs that a dot is recorded) appears on the line L1 (see "image data" in FIG. 11A), the pixel P1 is assigned to the preceding first scanning so as to be recorded with the ink ejected from, e.g., the ejection port N9 during the preceding first scanning to form a dot (see "recording method" in FIG. 11A). Next, referring to FIG. 10, the image data corresponding to a pixel P2 on the line L2 are examined. At this time, since "1" likewise appears on the line 2 as image data for the pixel P2 (see "image data" in FIG. 11A), the pixel P2 is assigned to the subsequent second scanning so as to be recorded with the ink ejected from the ejection port N2 to form a dot with the ejected ink (see "recording method" in FIG. 11A). Next, the image data corresponding to a pixel 4 located adjacent to the pixel P2 on the line L2 are examined to execute assignment to the pixel 4. At this time, since "1" likewise appears as image data, the pixel P4 is assigned to the first scanning to be recorded with the ink ejected from, e.g., an ejection port N10 on to form a dot with the ejected ink. Next assignment is executed for a pixel P3. Since "1" appears on the line L2 for the image data representing the pixel P3, a dot is formed with the ink injected from the ejection port N1 on completion of the second scanning. With respect to a pixel P5 having the next assignment executed therefor, since "0" appears as image data corresponding to the pixel P5, the program goes to a pixel P6 for which assignment is to executed. At this time, since "1" appears as image data corresponding to the pixel P6, assignment is executed to the pixel P6 such that a dot is formed with the ink ejected from, e.g., an ejection port N10 on completion of the first scanning.

Since assignment is executed for each ejection port and each scanning associated with a dot to be formed with the ink ejected therefrom in the above-described manner, there does not arise a malfunction that dots located adjacent to each other in the auxiliary scanning direction are recorded on completion of same scanning within the range defined by a set of odd-numbered line and even-numbered line. Even though the relationship between the foregoing set and another set of odd-numbered line and even-numbered line is taken into account, the maximum number of dots which are sequentially located adjacent to each other in the auxiliary direction and which are formed in same scanning is merely two.

With respect to the main scanning direction having a number of image data arranged as shown in FIG. 11A, dots located along a single line are formed with the ink ejected from different ejection ports, causing a stripe formed by the dots and a density of the same to fluctuate reducibly. On the contrary, with respect to a number of image data arranged as shown in FIG. 11B, a single line extending in the main scanning direction is recorded on completion of same scanning.

Although the above-described method has drawbacks as mentioned above, an image can be obtained with clear edge portions thereof in accordance with a comparatively simple algorithm while exhibiting few stripe and few fluctuation in density.

(Embodiment 2) (Corrected snake dance)

This embodiment is modified from the first embodiment. According to this embodiment, a single line extending in the main scanning direction is formed for any type of image with the ink ejected from a plurality of different ejection ports. In addition, dots located adjacent to each other in the main scanning direction are recorded by different scanning at an increased recording speed.

FIG. 12 show by way of illustrative views a method of aligning dots to be recorded by twice scanning based on an image data according to the second embodiment of the present invention.

Similar to the first embodiment, assignment is sequentially executed for the dots to be recorded during twice scanning within the range defined by two lines located adjacent each other in the auxiliary scanning direction. However, at this embodiment, the following correction is made corresponding to the position of the pixel (dot) already recorded in the main scanning direction (i.e., the assigned pixel located at the left-hand part of the drawing).

Here, for the purpose of simplifying the description of each of the following embodiments, it is assumed that a dot directly before a reference dot in the main scanning direction (i.e., a dot located adjacent to the reference dot on the left-hand side in the drawing) is represented by HA, a recorded dot (i.e., an assigned dot) located remote from the reference dot by a difference equal to one dot or more in the main scanning direction is represented by HR, and a recorded dot located adjacent to the reference dot in the auxiliary direction (i.e., a dot located adjacent to the reference dot on the upper side or the lower side) is represented by V.

1) In this embodiment, when snake dance data scanning, i.e., snake dance assignment as described in the first embodiment of the present invention is executed, in the case that HA is not present in pixels for which assignment processing shifts from the main scanning direction, e.g., pixels P4 and P5 (HA is not present in the pixel P5), recording is effected on completion of scanning different from the scanning for forming HR of the pixel P5 (i.e., a dot defining a pixel P1) (see FIG. 12A).

2) When snake movement-like route data scanning is executed, in the case that HA is present in pixels for which data scanning shifts from the auxiliary scanning direction, e.g., pixels P3 and P6 as shown in FIG. 12B (in practice, HA is present in each of the pixels P3 and P6), the pixels P3 and P6 are recorded on completion of scanning different from that for HA thereof. In addition, V of the pixels P3 and P6, i.e., pixels P4 and P5 are recorded on completion of scanning different from that for each of the pixels P3 and P6 (see FIG. 12(B)).

As a result of the correction carried out in the above-described manner, a single line extending in the main scanning direction is formed for any type of image using a plurality of different ejection ports, and moreover, each of dots located adjacent to each other in the main scanning direction is recorded on completion of different scanning. Consequently, stripe and fluctuation in density can be reduced. In addition, since dots on a single line extending in the main scanning direction which are recorded on completion of same scanning are parted away from each other by a distance equal to one pixel or more without fail, a main scanning speed can be increased two times without any variation of the frequency of ink ejection, resulting in the recording speed being improved.

(Embodiment 3) (Preference line-two line type)

This embodiment is one which can utilize a feature of the second embodiment and can simplify algorithm.

According to this embodiment, as shown in FIG. 13A to FIG. 13D, assignment is executed on completion of twice scannings for dots to be recorded based on image data by utilizing a set of odd-numbered line and even-numbered line in the same manner as the first embodiment and the second embodiment of the present invention.

Figure 13A:
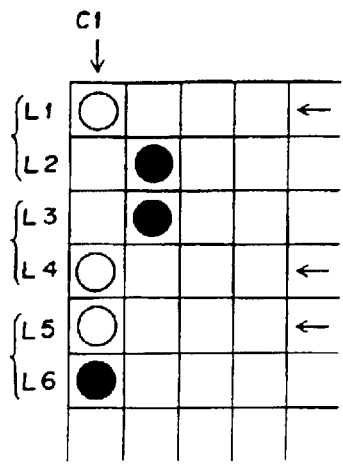
FIG. 13A to FIG. 13D are explanatory views which illustrate by way of example the assignment of scanning to be achieved for forming the dots by employing the ink jet recording method according to the third embodiment of the present invention.

1) Referring to FIG. 13A, in the case that a set of two lines is scanned in the main scanning direction and it is found that a first dot (data "1") is present on completion of the assignment processing for a column C1, this dot (i.e., a dot located on the odd-numbered line when dots are present on both the lines) is assigned to the preceding first scanning. The line having the foregoing dot located thereon is called a preference line (in FIG. 13A, lines L1, L4 and L5 are preference lines, respectively).

Figure 13B:
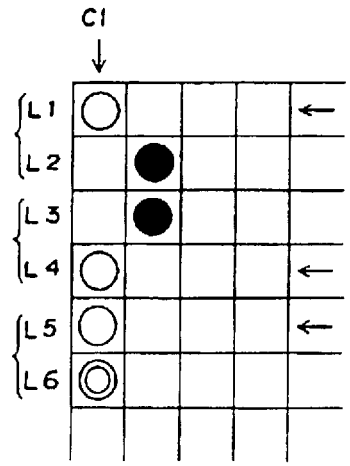

2) When a certain dot is located adjacent to the dot recognized in the auxiliary scanning direction on completion of the processing described in the paragraph (1) (i.e., a dot located on a line L6 in FIG. 13A), scanning different from that as explained in the paragraph (1) (i.e., subsequent second scanning) is assigned to the first-mentioned dot (see FIG. 13B).

Figure 13C:
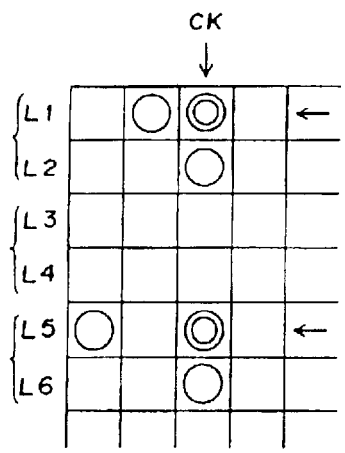

3) Referring to FIG. 13C, in the case that scanning is progressively effected in the main scanning direction for the image data corresponding to a single pixel and it is found on completion of the assignment processing for a column CK that preference lines L1, L4 and L5 explained in the paragraph (1) are present, assignment is executed to scanning different from that for HA (which is applicable to the line L1). In the case that HA is not present, assignment is executed to scanning different from that for HR (which is applicable to the line L5). In addition, when a pixel located adjacent to the reference pixel in the auxiliary scanning direction is present, different scanning is assigned to this adjacent pixel (which is applicable to the line L2 and the line L6).

Figure 13D:
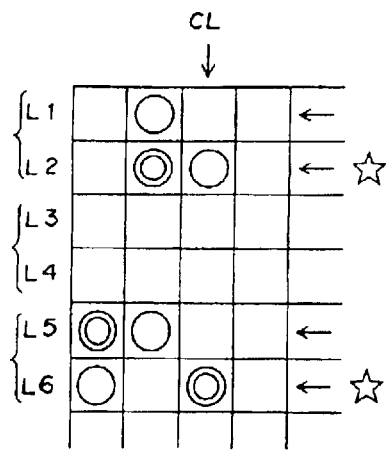

4) As shown in FIG. 13D, in the case that it is found on completion of the assignment processing for a column CL that the dot is not present on the present preference line, if the dot is present on the column CL of another line, assignment is executed to scanning different from that for HA of the dot on another line (which is applicable to the line L2). In the case HA is not present, assignment is executed to the scanning different from that for HR (which is applicable to the line L6). Subsequently, these lines (L2, L6) are changeably determined to be new preference lines.

5) When any dot is not present on both the lines, the program goes to a next column without any processing executed.

6) The steps as explained in the paragraphs (3) to the paragraph (5) are repeated.

According to this embodiment, the substantially same image as that in the second embodiment of the present invention can be obtained in accordance with a simple algorithm, and stripe and fluctuation in density can be reduced. Since dots recorded along a single line extending in the main scanning direction on completion of same scanning are parted away from each other by a distance equal to one pixel or more without fail, the main scanning speed can be increased two times without any variation of the frequency of ink ejection, resulting in the recording speed being improved. Incidentally, the first dot is assigned to the preceding scanning when the processing as explained in the paragraph (1) is executed. It of course is obvious that the first dot may be assigned to subsequent scanning, and thereafter, another subsequent assignment may reversely be executed.
(Embodiment 4) (Preference Line-Indefinite Line, Pixel Position Fixing Type)

A method to be practiced according to this embodiment is extensively modified from the preference line method defined in the third embodiment of the present invention in such a manner as to have three lines or more.

In this embodiment, as shown in FIG. 14A to FIG. 14D, a set of four lines is applied to the preference line method, and dots to be recorded are assigned to twice scannings based on the image data in the following manner.

1) Referring to FIG. 14A, in the case that data representing the four lines are scanned in the main scanning direction and it is found on completion of the assignment processing for a column C1 that a first dot to be recorded is present, this dot (a dot located on the upper line when dots are present on a plurality of lines) is assigned to preceding scanning. The line (L2) having the foregoing dot located thereon is taken as a preference line.

2) The same scanning as that assigned by executing the processing as explained in the paragraph (1) for the dot representing the pixel located every two lines in the auxiliary scanning direction is assigned to the dots (e.g. the dot on line L4) determined by executing the processing in the paragraph (1) (the dots of the even-numbered pixels the preference line), and moreover, scanning different from that allocated by executing the processing in the paragraph (1) for the dot (e.g. the dot on line L3) representing the pixel located adjacent to the first-mentioned dot (the dots of the odd-numbered pixels) is assigned to the dots as mentioned above (see FIG. 14B).

3) In the case that data representing a single pixel are progressively scanned in the main scanning direction.

3-1) As shown in FIG. 14C, it is found on completion of the assignment processing for a column CK that a dot to be recorded is present on the preference line (L2), assignment is executed to scanning different from that assigned to HA of the preference line (L2). In the case that HA is not present, assignment is executed to scanning different from that assigned to HR. In addition, same scanning is assigned to dots located every two pixels (the even-numbered pixels from the preference line) in the auxiliary scanning direction (dots located on a line L4), and moreover, scanning different from the foregoing one is assigned to pixels (the odd-numbered pixels from the preference line) located adjacent to the first-mentioned ones (dots located on a line L1).

3-2) As shown in FIG. 14D, in the case that a dot is not present on the preference line (L2) after completion of the processing for the column CL, lines located below the preference line (L2) are successively observed (but the observation is returned toward the uppermost line after the lowermost line among sets of lines is reached). Subsequently, when it is found that a dot is present on a line (L3), and the same time, its HA is present on the same, this line is taken as a new preference line. Subsequently, assignment is executed to scanning different from that assigned to the foregoing dot corresponding to HA. In addition, same scanning is assigned to dots located every two pixels (the even-numbered pixels from the preference line) in the auxiliary scanning direction (dots located on the line L1), and moreover, scanning different from the foregoing one is assigned to dots of pixels (the odd-numbered pixels from the preference line) located adjacent to the first-mentioned dots (dots located on the line L4).

4) In the case that any line having a dot and its HA located thereon is not present, lines located below the preference line are successively observed (but the observation is returned toward the uppermost line after the lowermost line among sets of lines is reached). Subsequently, when it is found that a dot is present on a certain line, this line is changeably taken as a preference line and scanning different from one for HR of the dot located on the new preference line is assigned to the dot. In addition, same scanning is assigned to dots of the pixels (the even-numbered pixels from the preference line) located every two pixel in the auxiliary direction, and moreover, scanning different from the foregoing one is assigned to dots present in a pixel (the odd-numbered pixels from the preference line) located adjacent to the foregoing pixels.

5) When a dot is not present on any line, the program goes to a next column without any processing executed.

6) The steps as explained in the paragraph 3) to the paragraph 5) are repeated.

According to this embodiment, V present in a set of lines is not assigned to same scanning in the same manner as the third embodiment of the present invention but V is assigned to the same scanning only when a line to be observed is located within the range defined by the set of lines. In this embodiment, since processings are executed for lines located within the wide range compared with the third embodiment of the present invention, the number of sets of lines covering the whole image is reduced. For this reason, this embodiment has an advantage that a rate of assigning V to same scanning is reduced. On the contrary, this embodiment has a drawback that a rate of assigning HR to same scanning is increased depending on the contour of an image to be scanned. Therefore, this embodiment is preferably employable in the case that a recording head originally having few stripes and few fluctuations in density is used for carrying out the present invention. In addition, this embodiment is preferably employable in the case that it is required that an image having clear edge portions is obtained regardless of occurrence of some fluctuation in stripe and density.

Incidentally, this embodiment has been described above with respect to a method of executing processings with a set of four lines but this method is applicable to any execution of processings regardless of the number of lines defining each set. It is preferable from the viewpoint of effectively using a memory that lines of which number is equal to a half of the number of ejection ports are practically used for practicing this embodiment. When scanning is assigned to dots other than the dots located on the preference line in association with the processings as explained in the paragraph 3) and the paragraph 4), the same scanning as that for dots located on the preference line is assigned to dots located every two pixels in the auxiliary scanning direction as counted from the dots located on the preference line. Alternatively, assignment may be executed by employing the following method.

1) In the case that dots are continuously arranged in the auxiliary direction, assignment is alternately executed to scannings to be effected.

2) In the case that dots are not continuously arranged in the auxiliary scanning direction, assignment is executed for scanning different from that for HA of the dots. In the case that HA is not present, assignment is executed to scanning different from that for HR.

(Embodiment 5) (Complete Sequential in a Line, Minimum V)

This embodiment is concerned with improvement of a method disclosed in Japanese Patent Application Laying-open No. 155036/1993. Specifically, this prior art relates to a method of sequentially assigning dots arranged on a single line in the main scanning direction to different scannings from each other wherein dots located adjacent to each other in the auxiliary direction are not recorded on completion of same scanning as far as possible.

FIG. 15A and FIG. 15B show by way of illustrative views a method of assigning dots to be recorded according to this embodiment to twice scannings based on image data. To practice this method, a plurality of main scanning lines are assigned and processed one by one from above. First, with respect to a first line, dots are sequentially assigned to two scannings. Similarly, with respect to a second line and subsequent ones, dots are sequentially assigned to two scannings. At this time; selection is made among two lines in such a manner that dots (V) located adjacent to each other in the auxiliary scanning direction are not assigned to same scanning as far as possible, one of the two lines being such that the first dot is assigned to preceding scanning, the other one being such that it is assigned to subsequent scanning. This selecting method is categorized into two kinds as noted below.

1) The number of V is minimized. For example, in the case of "image data" shown in FIG. 15A, with respect to an "assignment A", the location where V is assigned to same scanning is limited only to one location (i.e., a column C15). On the other hand, with respect to an "assignment B", the location where V is assigned to same scanning are represented by five locations (i.e., a column C1, a column C4, a column C7, a column C10 and a column C13). Therefore, to assure that the number of V is minimized, the "assignment A" is selected.

2) The sequential number of V is minimized. For example, in the case of an image as shown in FIG. 15B, with respect to the "assignment A", the maximum sequential number of V is two (which is applicable to the column C3, the column C6, the column C9, the column C12 and the column C15). On the other hand, with respect to the "assignment B", the maximum sequential number of V is three (which is applicable to the column C15). For this reason, the "assignment B" is selected.

Whether or not an excellent quality of image can be obtained by employing which one of the two methods explained in the paragraph 1) and the paragraph 2) depends on an ink and a recording paper to be used, a recording speed and the kind of image data. For this reason, it is desirable that either of the two methods explained in the paragraph 1) and the paragraph 2) is selectively determined in consideration of the aforementioned parameters. Generally, when the sequential number of V is small, an image having clear edge portions can be obtained. Thus, it is recommendable that the method explained in the paragraph 2) is usually used. Alternatively, the two methods explained in the paragraph 1) and 2) may alternately be used. Otherwise, the two methods explained in the paragraph 1) and the paragraph 2) may randomly be used. With respect to a first line, a first dot is assigned to preceding scanning. Alternatively, it of course is obvious that the first dot may be assigned to subsequent scanning.

(Embodiment 6) (Assignment Executed Every Column, HR and V Alternated)

According to this embodiment, as shown in FIG. 16B to FIG. 16E, image data are scanned in accordance with a pattern of arranging ejection ports in the auxiliary scanning direction, and subsequently, dots to be recorded are assigned to twice scanning based on the image data shown in FIG. 16A in the following manner.

First, as shown in FIG. 16A, with a first column C1, dots are sequentially assigned to two scannings. With respect to a second column and subsequent ones, each dot is assigned to scanning in the following manner.

1) When HA is present, assignment is executed to scanning different from that for HA (which is applicable to a dot in a column C2 of a line L1 shown in FIG. 16C).

2) When HA is not present, assignment is executed to scanning with reference to HR and V. Specifically, 2-1) When V is not present, assignment is executed to scanning different from that for HR (which is applicable to a dot in a column C3 of a line L3 shown in FIG. 16D).

2-2) When V is present, the case that assignment is executed to scanning different from that for V and the case that assignment is executed to scanning different from that for HR are alternately selected within the range defined by a same line. For example, as shown in FIG. 16E, with respect to a column C3, assignment is executed to scanning different from that for V (which is applicable to dots on a line L4, a line L5 and a line L6), and with respect to a column C5, assignment is executed to scanning same to that for V but scanning different from that for HR (which is applicable to dots on the line L6).

2-3) When V and HR are not present, assignment is executed to arbitrary scanning (i.e., preceding scanning in the shown case) (which is applicable to dots on a line L7 of a column C2 shown in FIG. 16(C)).

According to this embodiment, it can be avoided in the well-balanced state that HA HR and V are subjected to same scanning in accordance with a comparatively simple algorithm. Especially, with respect to HA, all assignments are executed to different scannings, whereby a main scanning speed can be increased two times without any variation of the ejection frequency, resulting in the recording speed being substantially improved. Also with respect to HR, the maximum number of assignments to be executed to same scanning is two, and this means that stripe and fluctuation in density can be reduced with any type of image. Incidentally, with respect to V, there arises an occasion that assignment is continuously executed to same scanning depending on the type of image.

In this embodiment, as explained in the paragraph 2-2), the selection for executing assignment to scanning depending on either of HR and V is made within the range defined by a same line. Alternatively, the selection may be made to all lines on the basis of common assignment. For example, according to a certain thinkable method, assignment is executed to scanning different from that for V on an odd-numbered column, while assignment is executed to scanning different from that for R on an even-numbered column. This method has an advantage that an available algorithm is more simply practiced but there arises an occasion that same scanning is continuously effected for HR. Alternatively, assignment may be executed to scanning only depending on V independently of HR. According to this method, it is possible to prevent V from being continuously subjected to same scanning. For this reason, this method is particularly employable in the case that it is desirous to obtain an image having clear edge portions.

Additionally, in this embodiment, image data are processed with respect to every arrangement of ejection ports in the auxiliary scanning direction. However, the width of processing in the auxiliary scanning direction should not be limited only to a specific one but it may be dimensioned to have an arbitrary width, e.g., a half of the width of arrangement of ejection ports, the whole width of an image or the like.

(Embodiment 7) (Nearly perfect)

According to this embodiment, data covering the whole image is scanned and each recorded dot is assigned to twice scannings.

1) All "candidates" for assignment of scanning to a first line L1 are listed below. A method of selecting the assignment to be executed for these candidates is practiced in the following manner (see FIG. 17A).

1-1) Preceding scanning is assigned to a first dot. With respect to a second dot and subsequent ones are scanned in the following manner.

1-2) When HA is present, assignment is executed to scanning different from that for HA (which is applicable to a column C2 to a column C4, a column C7 and a column C8.

1-3) When HA is not present, assignment is executed to scanning corresponding to HR. This assignment permits the same scanning as that for HR to be continuously effected twice (which is applicable to a column C6 belonging to the candidate B shown in FIG. 17A).

2) With respect to each of the candidates for the first line L1 determined in that way (of which number varies depending on image data but, usually, a plurality of candidates are determined), assignment is executed to scanning for a second line and subsequent ones based on the whole image data with the following definition as a reference.

2-1) With the candidate A as an example, first, preceding scanning and subsequent scanning are assigned to the first dot. This allows two candidates A1 and A2 to be settled. With respect to the second dot and subsequent ones, the following description is practicable.

2-2) When HA is present, assignment is executed to scanning different from that for HA (which is applicable to dots located on a line L2 and a column C2 to a column C8 shown in FIG. 17B).

2-3) When HA is not present, the following description is practicable.

2-3-1) In the case that V is not present or in the case that V is present and the number of same continuous scannings to be effected for V is two or less, assignment is executed to scanning different from that for HR (which is applicable to dots located on a line L3 and a column C3 shown in FIG. 17C while belonging to a candidate A21).

2-3-2) In the case that V is present and the number of same continuous scannings to be effected for V is three or more, it is permitted that same scanning is continuously twice effected for HR, and subsequently, assignment is executed to scanning different from that for V (which is applicable to dots located on the line L3 and the column C6 while belonging to the candidate A21 as well as dots located on the line L3 and the column C8 while belonging to a candidate A22 shown in FIG. 17C).

2-3-3) In the case that same scanning for HR is already continuously twice effected, assignment is executed to scanning different from that for HR (which is applicable to dots located on the line L3 and the column C8 while belonging to the candidate A21 shown in FIG. 17(c)).

2-4) Subsequently, V derived from the two assignments executed in the above-described manner (i.e., the assignment executed to the preceding scanning for the first dot and the assignment executed to the subsequent scanning for the same) is evaluated. In the case that it is found as a result of the evaluation that the number of equal continuous scannings is smaller than the foregoing one or equal to the latter, the case that a frequency of appearance of the foregoing number is smaller is taken as a scanning assignment for the relevant line. For example, in the case shown in FIG. 17B, the candidate A2 is selected, while in the case shown in FIG. 17B, the candidate A22 is selected.

2-5) The steps explained in the paragraph 2-1) to the paragraph 2-4) are repeated for a third line and subsequent ones.

3) The results derived from the scanning assignment having the steps explained in the paragraph 2) performed for all the candidates are evaluated based on V. In the case that the number of same continuous scannings is smaller than the foregoing one or same to the latter, the case that a frequency of appearance of the foregoing number is smaller is taken as a scanning assignment.

The algorithm employed for practicing this embodiment is complicated and required many memories. However, there very few times that HA, HR and V are assigned to same scanning. Especially, with respect to HA, different scanning is assigned to all of HA, and the main scanning speed can be increased two times without any variation of the ejection frequency. With respect to HR, the maximum number of same continuous scannings is two, whereby stripe and fluctuation in density can be reduced. In addition, with respect to V, the number of same continuous scanning can be reduced compared with that in the sixth embodiment, and moreover, an image having clear edge portions can be obtained.

In this embodiment, all the image data are processed. Alternatively, data processing may be achieved such that the image data are divided into plural regions and the foregoing data processing is effected in each of these regions to execute scanning assignment.

An alternative method for assigning scannings to the method described in the paragraph 3), such as a method for minimizing the total number of V and a method for minimizing the total of values which are obtained by multiplying the number of successive V by occurrence rate thereof, may be preferably used. Furthermore, a weighting procedure to each value using predetermined coefficients may be applicable to obtaining the total value.

Figure 18:
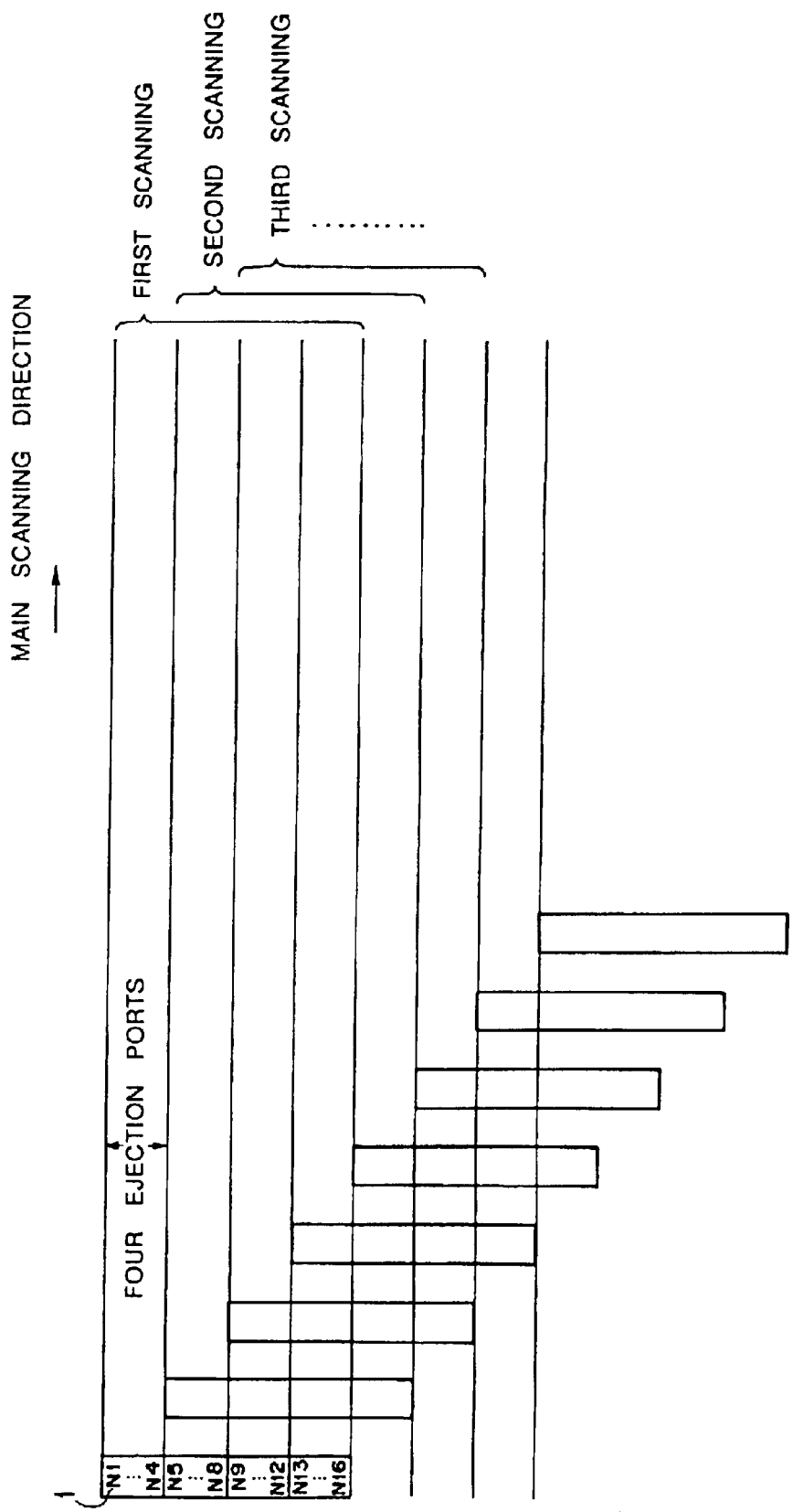
FIG. 18 is a schematic view which shows the relationship between recording head scanning and paper feeding to be achieved by an ink jet recording method according to each of eighth to tenth embodiments of the present invention.

FIG. 18 is a schematic view which illustratively explains the combined relationship between a quantity of conveyance of a recording paper and ejection ports to be used for each scanning according to each of an eighth embodiment to a tenth embodiment of the present invention to be practiced by operating the recording apparatus shown in FIG. 7.

In the drawing, reference numeral 1 schematically designates a recording head. In these embodiments, sixteen ejection ports N1 to N16 are divided into four groups so that dots to be recorded are assigned to four scannings. Specifically, to achieve first scanning, only ejection ports N13 to N16 are used, and ink droplets are then ejected from ejection ports assigned based on image data by employing a method according to each of the embodiments to be described later. Next, as shown in FIG. 18, the recording paper is upwardly fed by a distance corresponding to four ejection ports (FIG. 18 shows for the convenience of illustration that the recording head is relatively downwardly displaced so that recording is achieved using ejection ports N9 to N16 in response to second scanning. As a result, the same region as that recorded on completion of the preceding scanning is recorded with ink droplets ejected from ejection ports N9 to N12, and at the same time, a new region of the recording paper is recorded with ink droplets ejected from ejection ports N13 to N16. Next, the recording paper is upwardly displaced again by a distance corresponding to four ejection ports so that it is recorded with ink droplets ejected from ejection ports N5 to N16. In addition, the recording paper is upwardly displaced by a distance corresponding to four ejection ports N5 to N16. Such recording operations as mentioned above are sequentially repeated until the whole recording surface of the recording paper is recorded with ink droplets ejected from the ejection ports N1 to N16.

(Embodiment 8)

Figure 19:
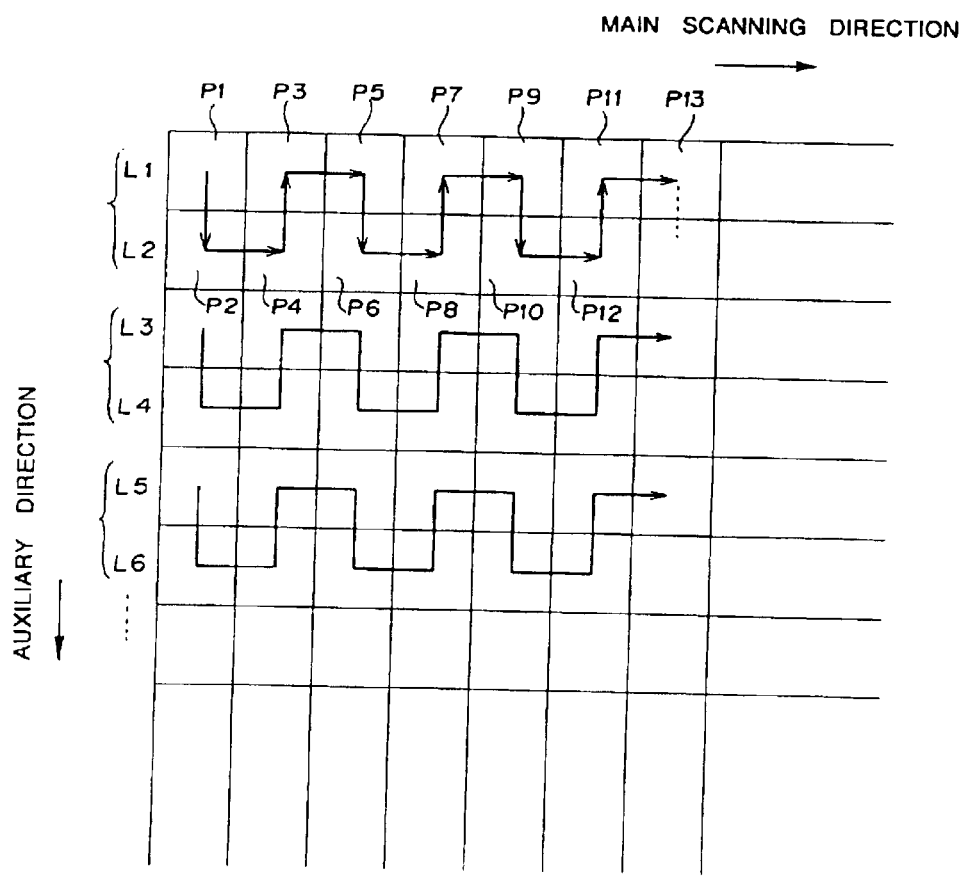
FIG. 19 is an explanatory view which illustrates by way of example the assignment of scanning for the dots recorded by employing the ink jet recording method according to the eighth embodiment of the present invention.

FIG. 19 is an illustrative view which shows that dots to be recorded based on image data are assigned to which one of four scannings according to this embodiment.

As shown in FIG. 19, dots to be recorded are sequentially assigned to four scannings within the range defined by two lines (L1 and L2, L3 and L4, L5 and L6, - - - ). Specifically, in this embodiment, image data are scanned along a snake dance within the range defined by two lines by utilizing a set of odd-numbered lines and even-numbered lines so that dots to be recorded are sequentially assigned to first to fourth scanning. It should be noted that any assignment is not executed to the fourth scanning with a series of continuous pixels on completion of the scanning along the snake dance.

The reason for this is as follows.

By the investigation of inventors of the present invention, it has been seen that running over of ink or bleeding on the recording paper can be controlled by varying an ink ejection manner. For example, when three ink droplets are ejected into each of two pixels adjacent to each other, less bleeding is raised in the case that dots of the two pixels are formed in different sets of scannings each other (for example, a set of a first, second and a fourth scannings and another set of the second, a third and the fourth scannings), than that raised in the case that dots of the two pixels are formed in same scannings (for example, the first, the second and the third scannings). Furthermore, by the investigation in detail of the inventors, less bleeding is raised in the case that the last ink droplet of three ink droplets is ejected in different scanning. Therefore, alternative combination of sets of scannings such as the combination of set of the first, the second and the third scanning with set of the first, the second and the fourth scannings, the combination of set of the first, the second and the third ones with set of the first, the third and the fourth ones, and the combination of set of the first, the second and the third ones with set of the second, the third and the fourth ones to the above described combination, may be applicable so that recording can be performed with less bleeding and more sharpness of the edge portion of recorded image, and color recording can be performed with less mixing ink of colors and sharpness of recorded image.

Figure 20A:
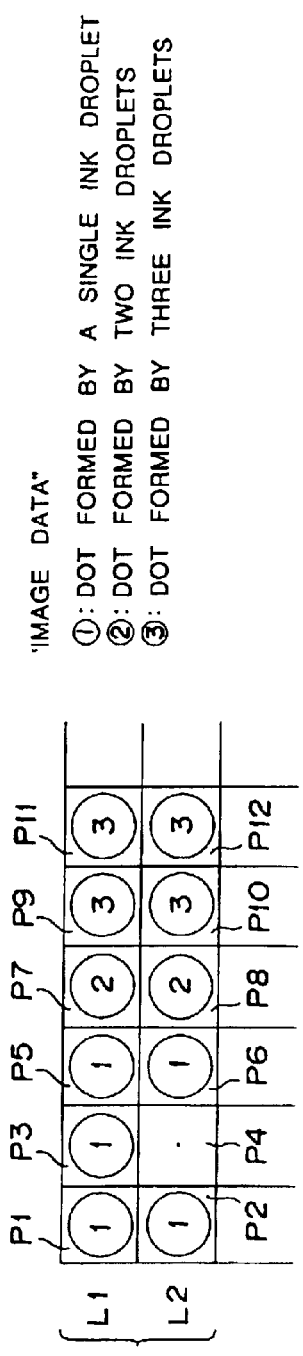
FIG. 20A and FIG. 20B are explanatory views which illustrate by way another example the assignment of scanning for forming the dots by employing the ink jet recording method according to the eighth embodiment of the present invention.

FIG. 20 concretely shows the method of assigning as mentioned above, and it is an illustrative view which shows how image data are assigned to four scannings.

Figure 20B:
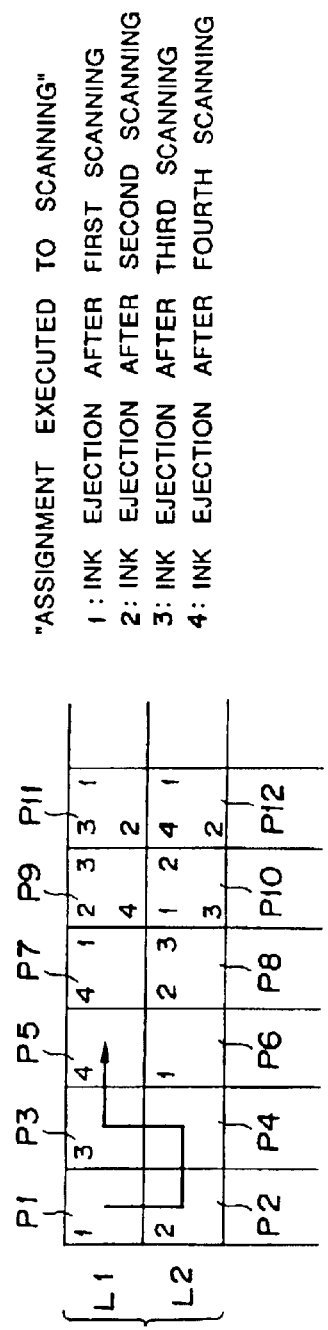

As shown in FIG. 20B, dots to be recorded are sequentially assigned to first scanning along a snake dance as represented by pixels P1, P2, P4, P3, P5 - - - , and when assignment proceeds to fourth scanning with which it is terminated, the program starts assignment again from first scanning. With respect to pixels each having a dot formed by a plurality of ink droplets (i.e., pixels represented by P7 to P12 in FIG. 20A), a plurality of ink droplets are assigned to continuous scanning as shown in FIG. 20B. In case that fourth scanning is assigned to a pixel (P12) located directly before a pixel P11 on completion of scanning along the snake dance, the program skips fourth scanning when the forth scanning is to be assigned to the P11. In this case, first scanning is assigned to the pixel P11.

As a result of the assignment executed in the above-described manner, there does not arise an occasion that pixels located adjacent to each other in the auxiliary scanning direction are recorded with a combination of same scannings within the range defined by a set of odd-numbered line and even-numbered line. Thus, a quantity of ink to be shot for every unit of time can be reduced, and this makes it possible to reduce the degree of bleeding. In the case that the number of ink droplets is three, since ink droplets are not simultaneously shot to pixels located adjacent to each other in the auxiliary direction, this leads to the result that a malfunction of bleeding hardly occurs. In the case that pixels located adjacent to each other are assigned to same scanning between a set of adjacent lines (i.e., between an even-numbered line and an odd-numbered line) and the number of ink droplets to be shot is three, since there is a possibility that ink droplets are simultaneously shot on completion of fourth scanning, a malfunction of bleeding occurs to some extent. Although the above-described method has a drawback as mentioned above, an image having few stripe and few fluctuation in density can be obtained with clear edge portions.

In this embodiment, a first ink droplet is assigned to first scanning. It of course is obvious that the first ink drop may be assigned to other scanning. The processing for skipping the order of assignment so as not to allow assignment to be executed to the fourth scanning with pixels located adjacent to each other in the auxiliary scanning direction serves to skip the fourth scanning in the case that the maximum number of ink droplets for forming a dot is three. It is obvious that the scanning to be skipped in that way is determined depending on the maximum number of ink droplets.

(Embodiment 9)

In this embodiment, as shown in FIG. 21, a dot to be recorded is assigned to four scannings based on image data by utilizing a set of four lines in the following manner.

1) Four lines are scanned in the auxiliary direction (in the downward direction from above in the drawing), and first to fourth scannings are successively assigned to a dot to be recorded. At this time, scanning is continuously assigned to the dot composed of a plurality of ink droplets in the same manner as the eighth embodiment of the present invention. Here, the line including a pixel to which third scanning is first assigned (i.e., a line L2 in FIG. 21B) is taken as a preference line.

2) As shown in FIG. 21C, scanning proceeds in the auxiliary scanning direction so that it is sequentially assigned to the dot to be recorded. At this time when the program assumes to the order that third or fourth scanning is assigned, in the case that the line associated with the foregoing pixel is an even-numbered line as counted from the preference line, the third scanning is assigned to the dot (which is applicable to a column C1 of a line IA) regardless of the order of scanning assignment. On the contrary, in the case that the line associated with the pixel is an odd-numbered line, the fourth scanning is assigned to the dot regardless of the order of scanning assignment. In each of the foregoing cases, scanning to be subsequently assigned is taken as first scanning.

3) Scanning proceeds in the main scanning direction at a distance corresponding to one pixel.

3-1) As shown in FIG. 21D, in the case that a dot to be recorded is present on the preference line, assignment is executed to scanning (scanning to be effected in accordance with a next order) different from that for forming HA of the dot (which is applicable to a column C2 of a line L2). In the case that HA is not present, assignment is executed to scanning different from that for forming HR. Thereafter, assignment is sequentially executed in the downward direction.

3-2) As shown in FIG. 21E, in the case that a dot to be recorded is not present in the pixel located on the preference line, lines are sequentially observed downward of the preference line (when the lowermost end line among a plurality of sets of line is reached, the program returns to the uppermost end line) so that scanning different from that for forming HA (scanning to be effected in accordance with the next order) is assigned to the pixel including a dot to be recorded (which is applicable to a column C3 of a line L3). In the case that HA is not present, assignment is executed to scanning different from that for forming HR. Subsequently, scanning is assigned to a dot to be recorded in accordance with the order to be started from the preceding scanning. Here, a line including a pixel to which third or fourth scanning is first assigned (i.e., the line L3) is changeably taken as a preference line.

4) As shown in FIG. 21D and FIG. 21F, scanning proceeds in the main scanning direction (when the lowermost end line among a plurality of sets of lines is reached, the program returns to the uppermost end line) so that scanning is sequentially assigned to a dot to be recorded. At this time when the program assumes the order that third scanning or fourth scanning is executed, in the case that the line associated with the pixel is an even-numbered line as counted from the preference line, assignment is executed to scanning equal to that for the preference line regardless of the order of scanning assignment. On the contrary, in the case that the line associated with the pixel is an odd-numbered line as counted from the same, assignment is executed to scanning different from that for the preference line regardless of the order of scanning assignment (which is applicable to a column C3 of a line L4). In each of the foregoing cases, scanning to be subsequently assigned is taken as first scanning.

5) When a dot is not present on any line, the program goes to a next step without any processing executed.

6) The steps explained in the paragraph 3) to the paragraph 5) are repeated.

In this embodiment, pixels located adjacent to each other within the range defined by a set of lines in the auxiliary scanning direction are not recorded by combining same scannings with each other in the same manner as the eighth embodiment of the present invention. In addition, since processing is achieved with lines located within the wide range compared with the eighth embodiment of the present invention, this embodiment provides advantages that the whole image is composed of a small number of sets of lines, and moreover, pixels located adjacent to each other in the auxiliary direction are recorded with ink droplets at a recording low rate on completion of same scanning.

This embodiment has been described above with respect to a method of processing a set of four lines. Alternatively, this process may be applied to any set of lines regardless of the number of lines. It should be noted that it is preferable from the viewpoint of effective usage of the memories that the number of lines obtained by dividing the number of ejection ports by the number of scannings for forming one line is used for practicing this embodiment.

Incidentally, in this embodiment, first ink droplets are assigned to first scanning. It of course is obvious that they may be assigned to other scanning.

In addition, in this embodiment, a line including the pixel to which the third or the fourth scanning is assigned is set to be the preference line. However, in the case that the number of scannings is not four but n, a line including the pixel to which the n-th or the (n-1)th scannings is assigned.

(Embodiment 10)

According to this embodiment, four scannings are assigned to a dot to be recorded based on image data in the following manner by employing a method shown in FIG. 22.

1) Scanning proceeds in the main scanning direction (in the rightward direction as seen from the lefthand side in the drawing) so that first scanning to fourth scanning are sequentially assigned to a dot to be recorded. With respect to a pixel wherein the number of ink droplets for a dot to be recorded is three, when the value obtained by adding the line number as counted with the foregoing pixel from the upper end of an image in the auxiliary scanning direction to the column number as counted with the pixel from the left-hand end of the image in the main scanning direction assumes an odd numeral, the first scanning, the second scanning and the third scanning are assigned to the pixel. On the contrary, when the foregoing value assumes an even numeral, the first scanning, the second scanning and the fourth scanning are assigned to the pixel.

2) With respect to a pixel wherein the number of ink droplets for a dot to be recorded is a numeral other than three, first scanning to fourth scanning are sequentially assigned to the pixel.

According to this embodiment, pixels located adjacent to each other not only in the main scanning direction but also in the auxiliary scanning direction are not recorded in accordance with a simple algorithm by combining same scanning with each other. In addition, in the case that the number of ink droplets to be shot is three, ink droplets are not simultaneously shot on completion of the fourth scanning. Thus, a malfunction of bleeding hardly arises according to this embodiment. However, in the case that the number of ink droplets to be shot is three, since a combination among the second scanning, the third scanning and the fourth scanning is not used, this embodiment has drawbacks that the frequency of usage of ejection ports varies to some extent, and moreover, insignificant problems arise attributable to the foregoing variation of the frequency in association with fluctuation in stripe and density as well as durability of the ejection ports. It of course is obvious that the odd-numbered numeral and the even-numbered numeral employed for indicating the results of the assignments explained in the paragraph 1) may be represented in the reverse manner.

Each of the eighth embodiment to the tenth embodiment of the present invention has been described with respect to the case that the number of scannings is four and the maximum number of ink droplets to be shot per each pixel is three. It of course is obvious that the number of scannings and the maximum number of ink droplets to be shot per each pixel may be a numeral other than the foregoing ones.

Even though the maximum number of ink droplets to be shot is equal to or more than the number of scannings, the present invention is equally applicable to a pixel having ink droplets shot thereto with the number of scannings set to one or less. According to this embodiment, in the case that a small number of pixels are shot with ink droplets of which number is equal to or more than the number of scannings, an excellent quality of image can be obtained with few occurrence of a malfunction of bleeding.

In addition, also in the case that a large number of pixels are shot with ink droplets of which number is equal to or more than the number of scannings, the present invention may be carried out in the modified manner such that a plurality of ink droplets to be shot on completion of preceding scanning are substituted for the ink droplets to be shot on completion of final scanning.

Figure 23:
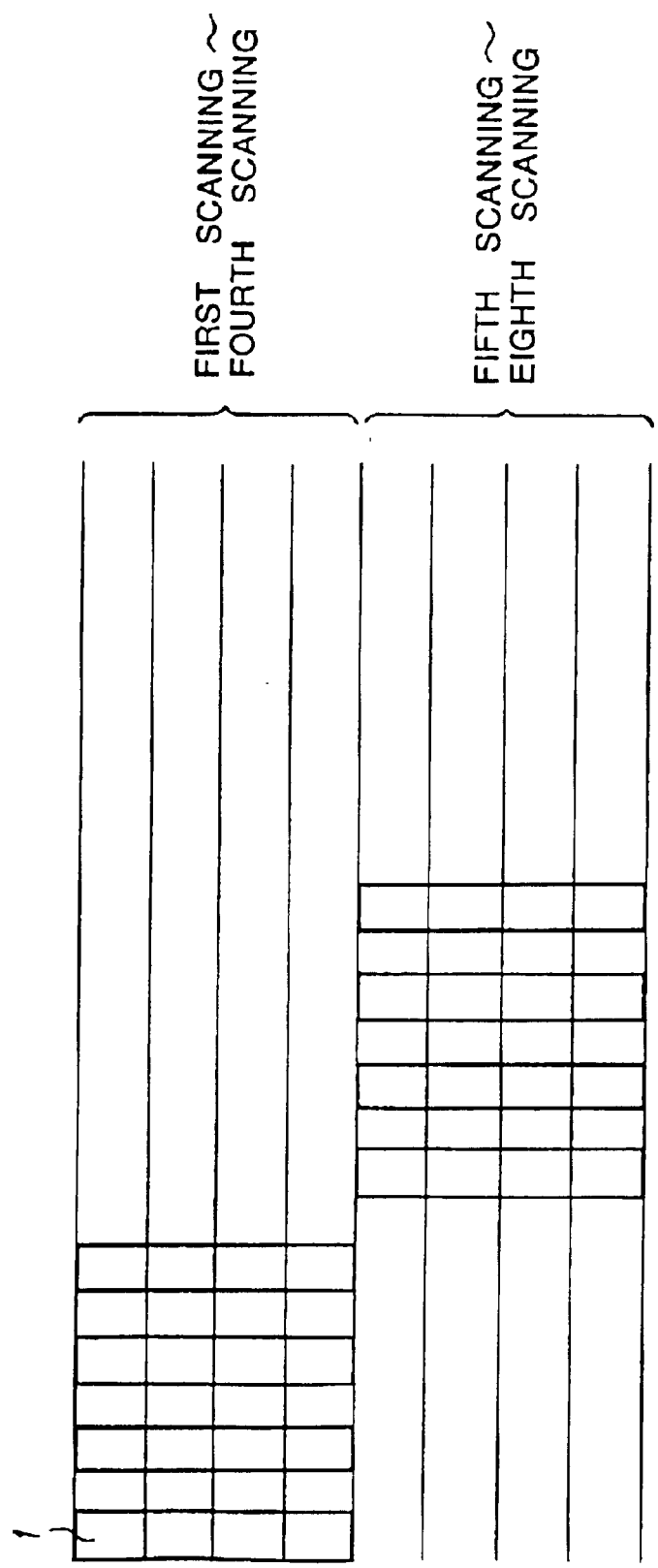
FIG. 23 is a schematic view which shows the relation between scanning of a recording head and paper feeding each of which is to be achieved in an embodiment of the present invention.

In each of the above-described embodiments of the present invention, in order to prevent fluctuation in density, dots included in the same line are formed by using different ejection ports from each other. However, in the case that an image which fluctuation in density does not effect significantly is to be recorded, or in the case that recording is performed by using the recording head which has little fluctuation in quantity of inkdroplet ejected from each of the ejection ports and in the direction of ejected inkdroplet, it is no need that each line is formed by using different ejection ports. For example, as shown in FIG. 23, each line may be formed by a plurality of scannings without auxiliary scanning, that is, feeding of the recording paper during forming the line. In this case, similar effect regarding bleeding to each of the embodiment described above can be achieved.

Furthermore, as seen in the embodiment, according to the present invention, two adjacent dots in the main scanning direction or the auxiliary scanning direction are formed inevitably at an interval for one scanning time of the recording head or more. Such adjacent dots are generally present in a border of a regium formed by one scanning of the recording head. According to the present invention, other than that two adjacent dots can be also formed at the above-described interval.

The present invention achieves a distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.-70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to preferred embodiments, and it will now be that changes and modifications may be made without departing from the invention in its broader aspects, and it is the intention, therefore, in the appended claims to cover all such changes and modifications fall within the true spirit of the invention.

What is claimed is:

1. A jet recording method of performing a recording operation with dots each formed on a recording medium with ink ejected from a recording head including a plurality of ejection ports, said method comprising the steps of:

assigning, based on image data, one of the ejection ports for ejecting ink to form a dot for building a plurality of lines and which numbered scanning in which ink is ejected from the one of ejection ports, to said dot, when the recording operation is performed so as to build the plurality of lines with the dots formed by plural times of scanning achieved by the recording head, the order of the ejection ports and the scannings having been assigned in such a manner that a plurality of dots for building the plurality of lines are formed by ejecting the ink from the ejection ports different from each other in accordance with an order of plural times of scannings different from each other, and the order of the scannings to be effected for ink ejection for building the lines with the dots having been assigned on the basis of an order of scannings for the dots to which the assignment has been already executed, on a specific line having the dots belonging thereto while the dots are arranged for building the lines, and on a row of dots located in the direction of extension of the lines, performing the plural times of scannings with the recording head, and forming the dots to which the order of scanning is assigned by ejecting the ink from the ejection ports assigned on completion of each of the plural times of scannings, and combining a plurality of lines continuously extending in the direction of arrangement of the lines to build a set of lines, said step of assignment meeting the conditions as recited below in paragraphs a), b), and c):

a) two dots located adjacent to each other on each line within a range defined by the set of lines are formed in accordance with the order of scannings different from each other;

b) dots located adjacent to each other in the direction of arrangement of the plurality of lines within a range defined by said set of lines are formed in accordance with the order of scannings different from each other; and c) dots not defined in the preceding paragraphs a) and b) are formed in accordance with the order of main scannings different from those for each dot located directly before each of the set of lines.

2. An ink jet recording method of performing a recording operation with dots each formed on a recording medium with ink ejected from a recording head including a plurality of ejection ports, said method comprising the steps of:

assigning based on image data, one of the ejection ports for ejecting ink to form the dot for building a plurality of lines and which numbered scanning in which ink is ejected from said one of ejection ports, to said dot, when the recording operation is performed so as to build the plurality of lines with the dots formed by plural times of scanning achieved by the recording head, the order of the ejection ports and the scannings having been assigned in such a manner that a plurality of dots for building the plurality of lines are formed by ejecting the ink from the ejection ports different from each other in accordance with an order of plural times of scannings different from each other, and the order of the scannings to be effected for ink ejection for building the lines with the dots having been assigned on the basis of an order of scannings for the dots to which the assignment has been already executed, on a specific line having the dots belonging thereto while the dots are arranged for building the lines, and on a row of dots located in the direction of extension of the lines, performing the plural times of scannings with the recording head, and forming the dots to which the order of scanning is assigned by ejecting the ink from the ejection ports assigned on completion of each of the plural times of scannings, in said assigning step, a plurality of dots, each building one of the plurality of lines, are formed in accordance with an order of scannings sequentially different from each other, and an order of scannings is assigned to each dot in such a manner that the number of times of recording operations performed for recording dots located adjacent to each other in the direction of arrangement of the plurality of lines in accordance with an order of continuous same scannings is minimized.

3. An ink jet recording method of performing a recording operation with dots each formed on a recording medium with ink ejected from a recording head including a plurality of ejection ports, said method comprising the steps of:

assigning based on image data, one of the ejection ports for ejecting ink to form the dot for building a plurality of lines and which numbered scanning in which ink is ejected from said one of ejection ports, to said dot, when the recording operation is performed so as to build the plurality of lines with the dots formed by plural times of scanning achieved by the recording head, the order of the ejection ports and the scannings having been assigned in such a manner that a plurality of dots for building the plurality of lines are formed by ejecting the ink from the ejection ports different from each other in accordance with an order of plural times of scannings different from each other, and the order of the scannings to be effected for ink ejection for building the lines with the dots having been assigned on the basis of an order of scannings for the dots to which the assignment has been already executed, on a specific line having the dots belonging thereto while the dots are arranged for building the lines, and on a row of dots located in the direction of extension of the lines, performing the plural times of scannings with the recording head, and forming the dots to which the order of scanning is assigned by ejecting the ink from the ejection ports assigned on completion of each of the plural times of scannings, wherein two dots located adjacent to each other on each of the plurality of lines are formed in accordance with an order of scannings different from each other.

4. The ink jet recording method according to claim 3, wherein in said assigning step, in the case that dots located adjacent to each other are not present on one of the plurality of lines to be assigned, the assigning of an order of scannings is performed with preference alternately given to the following conditions:

a) dots located adjacent to each other in the direction are formed in accordance with an order of scannings different from each other, and b) dots located adjacent to each other directly before one of the plurality of lines are formed in accordance with an order of scannings different from those in the preceding paragraph.

5. The ink jet recording method according to claim 3, wherein in said assigning step, in the case that dots located adjacent to each other are not present on one of the plurality of lines to be assigned, dots located adjacent to each other in the direction of arrangement of the plurality of lines are formed in accordance with an order of scannings different from each other.

6. The ink jet recording method according to claim 3, wherein in said assigning step, when it is assumed that the number of times when continuous dots located not adjacent to each other on one of the lines are sequentially recorded in accordance with the order of same scannings is designated by HN and the number of times when dots located adjacent to each other in the direction of arrangement of the plurality of lines are continuously recorded in accordance with the order of same scannings is designated by VN, a) in the case that assigning an order of scannings so as to allow the HN and VN to be minimized is present, each dot is formed in accordance with the order of the scannings, and b) in the case that assigning an order of scannings so as to allow the HN and VN to be minimized is not present, each dot is formed in accordance with an order of scannings for allowing the VN to be minimized under a condition that the HN is two or less.

7. An ink jet recording method of performing a recording operation with dots each formed on a recording medium with ink ejected from a recording head including a plurality of ejection ports while scanning of the recording head is assigned, wherein when the scanning is assigned to the dot for forming the dot, the assignment includes considering a two dimensional arrangement of the dots including the dot, wherein times of the scanning assigned for forming the dot is one or two times, wherein the assignment considering the two dimensional arrangement of dots is such that the assignment to the dots arranged in a main scanning direction in which the scanning is performed and to the dots arranged in a auxiliary scanning direction which is different from the main scanning direction, and combining a plurality of lines continuously extending in the auxiliary scanning direction to build a set of lines, said step of assignment meeting the conditions as recited below in paragraphs a), b), and c):

a) two dots located adjacent to each other on each line within a range defined by the set of lines are formed in accordance with the order of scannings different from each other;

b) dots located adjacent to each other in the auxiliary scanning direction within a range defined by the set of lines are formed in accordance with the order of scannings different from each other; and c) dots not defined in the preceding paragraphs a) and b) are formed in accordance with the order of main scannings different from those for each dot located directly before each of the set of lines.

8. An ink jet recording method of performing a recording operation with dots each formed on a recording medium with ink ejected from a recording head including a plurality of ejection ports while scanning of the recording head is assigned, wherein when the scanning is assigned to the dot for forming the dot, the assignment includes considering a two dimensional arrangement of the dots including the dot, wherein times of the scanning assigned for forming the dot is one or two times, wherein the assignment considering the two dimensional arrangement of dots is such that the assignment to the dots arranged in a main scanning direction in which the scanning is performed and to the dots arranged in a auxiliary scanning direction which is different from the main scanning direction, wherein a plurality of dots each building one of the plurality of lines extending in the main scanning direction are formed in accordance with an order of scannings sequentially different from each other, and an order of scannings is assigned to each dot in such a manner that the number of times of recording operations performed for recording dots located adjacent to each other in the auxiliary scanning direction in accordance with an order of continuous same scannings is minimized.

9. An ink jet recording method of performing a recording operation with dots each formed on a recording medium with ink ejected from a recording head including a plurality of ejection ports while scanning of the recording head is assigning, wherein when the scanning is assigned to the dot for forming the dot, the assignment includes considering a two dimensional arrangement of the dots including the dot, wherein times of the scanning assigned for forming the dot is one or two times, wherein the assignment considering the two dimensional arrangement of dots is such that the assignment to the dots arranged in a main scanning direction in which the scanning is performed and to the dots arranged in a auxiliary scanning direction which is different from the main scanning direction, wherein two dots located adjacent to each other on each of the plurality of lines extending in the main scanning direction are formed in accordance with an order of scannings different from each other.

10. The ink jet recording method according to claim 9, wherein in the assignment, in the case that dots located adjacent to each other are not present on one of the plurality of lines to be assigned, the assigning of an order of scannings is performed with preference alternately given to the following conditions:

a) dots located adjacent to each other in the auxiliary scanning direction are formed in accordance with an order of scannings different from each other; and b) dots located adjacent to each other directly before one of the plurality of lines are formed in accordance with an order of scannings different from those in the preceding paragraph.

11. The ink jet recording method according to claim 9, wherein in the assigning, in the case that dots located adjacent to each other are not present on one of the plurality of lines to be assigned, dots located adjacent to each other in the auxiliary scanning direction are formed in accordance with an order of scannings different from each other.

12. The ink jet recording method according to claim 9, wherein in the assigning, when it is assumed that the number of times when continuous dots located not adjacent to each other on one of the lines are sequentially recorded in accordance with the order of same scannings is designated by HN and the number of times when dots located adjacent to each other in the direction of arrangement of the plurality of lines are continuously recorded in accordance with the order of same scannings is designated by VN, a) in the case that assigning an order of scannings so as to allow the HN and VN to be minimized is present, each dot is formed in accordance with the order of the scannings, and b) in the case that assigning an order of scannings so as to allow the HN and VN to be minimized is not present, each dot is formed in accordance with an order of scannings for allowing the VN to be minimized under a condition that the HN is two or less.

* * * * *

UNITED STATES PATENT AND TRADEMARK OFFICE
CERTIFICATE OF CORRECTION

PATENT NO. : 6,779,872 B2
DATED : August 24, 2004
INVENTOR(S) : Makato Shiyoa et al.

It is certified that error appears in the above-identified patent and that said Letters Patent is hereby corrected as shown below:

Title page,
Item [75], Inventors "Kanagawa (JP)" should read -- Yokohama (JP) --.
Item [62], Related U.S. Application Data, "division" should read -- continuation --.
Item [56], References Cited, FOREIGN PATENT DOCUMENTS
"056847" should read -- 54-056847 --; "123670" should read -- 59-123670 --; "138461" should read -- 59-138461 --; "071260" should read -- 60-071260 --; "107975" should read -- 60-107975 --; and "155036" should read -- 5-155036 --.

Column 1,
Lines 7 and 9, "application" (second occurrence) should read -- Application --; and
Line 34, "method" should read -- methods --.

Column 3,
Line 3, "fluctuation" should read -- fluctuations --;
Line 58, "method" should read -- methods --; and
Line 66, "explain" should read -- explains --.

Column 4,
Line 12, "a," should read -- $\sigma$, --; and
Line 16, "fluctuation" should read -- fluctuations --.

Column 5,
Line 3, "quantity" should read -- quality -- and "stripe" should read -- stripes --;
Line 4, "fluctuation" should read -- fluctuations --; and
Line 42, "resent" should read -- present --.

Column 8,
Line 50, "an" should be deleted.

Column 10,
Line 43, "I" should read -- 1 --.

Column 11,
Line 2, "is to" should read -- is to be --;
Line 32, "stripe" should read -- stripes --; "fluctuation" should read -- fluctuations --; and
Line 42, "show" should read -- shows --.

UNITED STATES PATENT AND TRADEMARK OFFICE
CERTIFICATE OF CORRECTION

PATENT NO. : 6,779,872 B2
DATED : August 24, 2004
INVENTOR(S) : Makato Shiyoa et al.

It is certified that error appears in the above-identified patent and that said Letters Patent is hereby corrected as shown below:

Column 13,
Lines 55 and 60, "(e.g." should read -- (e.g., --.

Column 14,
Line 39, "pixel" should read -- pixels --; and
Line 49, "to same" should read -- to the same --.

Column 15,
Line 34, "same" should read -- the same --.

Column 16,
Line 55, "HA HR" should read -- HA, HR --.

Column 17,
Line 27, "twice" should read -- twice the --.

Column 18,
Line 23, "17B," should read -- 17A, --.

Column 19,
Line 60, "scanning" should read -- scannings --.

Column 20,
Line 23, "direction- are" should read -- direction are --;
Line 39, "stripe" should read -- stripes --; and
Line 40, "fluctuation" should read -- fluctuations --.

Column 21,
Line 6, "IA)" should read -- L4) --; and
Line 28, "line" should read -- lines --.

Column 23,
Line 13, "rence" should read -- rences --;
Lines 29 and 30, "inkdroplet" should read -- ink droplet --;
Line 43, "regium" should read -- region --;
Line 45, "that" should read -- that, -- and "be also" should read -- also be --.

UNITED STATES PATENT AND TRADEMARK OFFICE
CERTIFICATE OF CORRECTION

PATENT NO. : 6,779,872 B2
DATED : August 24, 2004
INVENTOR(S) : Makato Shiyoa et al.

It is certified that error appears in the above-identified patent and that said Letters Patent is hereby corrected as shown below:

Column 24,
Line 53, "be also" should read -- also be --.

Column 25,
Line 33, "fall" should read -- that fall --.

Signed and Sealed this

Twenty-eighth Day of December, 2004

JON W. DUDAS
*Director of the United States Patent and Trademark Office*